United States Patent
Klinker et al.

(10) Patent No.: US 7,561,517 B2
(45) Date of Patent: Jul. 14, 2009

(54) PASSIVE ROUTE CONTROL OF DATA NETWORKS

(75) Inventors: James Eric Klinker, San Jose, CA (US); Steven R. McCanne, Berkeley, CA (US)

(73) Assignee: Internap Network Services Corporation, Atlanta, GA (US)

( * ) Notice: Subject to any disclaimer, the term of this patent is extended or adjusted under 35 U.S.C. 154(b) by 0 days.

(21) Appl. No.: 10/283,798

(22) Filed: Oct. 29, 2002

(65) Prior Publication Data

US 2003/0133443 A1    Jul. 17, 2003

Related U.S. Application Data

(60) Provisional application No. 60/350,186, filed on Nov. 2, 2001.

(51) Int. Cl.
*G01R 31/08* (2006.01)
(52) U.S. Cl. .................................. 370/235; 370/229
(58) Field of Classification Search ......... 370/229–238, 370/395.2, 395.21, 241, 244, 247, 248, 249, 370/250, 251, 252, 253, 352, 401
See application file for complete search history.

(56) References Cited

U.S. PATENT DOCUMENTS

| | | | |
|---|---|---|---|
| 5,598,532 A | 1/1997 | Liron | |
| 5,724,513 A | 3/1998 | Ben-Nun et al. | |
| 5,781,534 A | 7/1998 | Perlman et al. | |
| 5,870,561 A | 2/1999 | Jarvis et al. | |
| 5,898,668 A | 4/1999 | Shaffer | |
| 5,933,425 A * | 8/1999 | Iwata ........................ | 370/351 |
| 5,953,312 A | 9/1999 | Crawley et al. | |
| 5,974,237 A | 10/1999 | Shurmer et al. | |
| 6,047,326 A | 4/2000 | Kilkki | |
| 6,047,331 A | 4/2000 | Medard et al. | |

(Continued)

FOREIGN PATENT DOCUMENTS

EP    1017203    7/2000

(Continued)

OTHER PUBLICATIONS

Labovitz, et al., "Delayed Internet Routing Convergence," IEEE Jun. 2001, pp. 293-306, vol. 9, No. 3.

(Continued)

*Primary Examiner*—Michael J Moore, Jr.
(74) *Attorney, Agent, or Firm*—Kilpatrick Stockton LLP

(57) ABSTRACT

A system and a method for controlling routing of data over multiple networks. Accordingly, a system and method are provided for routing data between a first point and a second point. The method comprises passively monitoring at least one data flow characteristic associated with a data flow on a first path, comparing the at least one data flow characteristic, associated with the data flow on the first path, to an associated data flow requirement of a policy, switching the data flow to a second path if the at least one data flow requirement is not met, passively monitoring at least one data flow characteristic associated with the data flow on the second path, and comparing the at least one data flow characteristic associated with the data flow on the second path with the associated data flow requirement of the policy.

21 Claims, 26 Drawing Sheets

U.S. PATENT DOCUMENTS

| | | | |
|---|---|---|---|
| 6,055,571 A | 4/2000 | Fulp et al. | |
| 6,064,677 A | 5/2000 | Kappler et al. | |
| 6,078,957 A | 6/2000 | Adelman et al. | |
| 6,097,699 A * | 8/2000 | Chen et al. | 370/231 |
| 6,130,890 A | 10/2000 | Leinwand et al. | |
| 6,154,778 A | 11/2000 | Koistinen et al. | |
| 6,181,679 B1 | 1/2001 | Ashton et al. | |
| 6,185,635 B1 | 2/2001 | O'Loughlin et al. | |
| 6,226,751 B1 | 5/2001 | Arrow et al. | |
| 6,249,801 B1 | 6/2001 | Zisapel et al. | |
| 6,252,848 B1 | 6/2001 | Skirmont | |
| 6,256,314 B1 | 7/2001 | Rodrig et al. | |
| 6,262,976 B1 | 7/2001 | McNamara | |
| 6,275,470 B1 | 8/2001 | Ricciulli | |
| 6,292,464 B1 | 9/2001 | Elahmadi et al. | |
| 6,363,053 B1 | 3/2002 | Schuster et al. | |
| 6,363,056 B1 | 3/2002 | Beigi et al. | |
| 6,374,300 B2 | 4/2002 | Masters | |
| 6,393,486 B1 | 5/2002 | Pelavin et al. | |
| 6,400,681 B1 | 6/2002 | Bertin et al. | |
| 6,404,769 B1 | 6/2002 | Kapoor | |
| 6,405,219 B2 | 6/2002 | Saether et al. | |
| 6,466,984 B1 * | 10/2002 | Naveh et al. | 709/228 |
| 6,496,477 B1 * | 12/2002 | Perkins et al. | 370/228 |
| 6,549,781 B1 | 4/2003 | O'Byrne et al. | |
| 6,574,195 B2 * | 6/2003 | Roberts | 370/235 |
| 6,625,150 B1 | 9/2003 | Yu | |
| 6,658,457 B2 | 12/2003 | Nishikawa et al. | |
| 6,665,702 B1 | 12/2003 | Zisapel | |
| 6,678,248 B1 * | 1/2004 | Haddock et al. | 370/235 |
| 6,690,649 B1 * | 2/2004 | Shimada | 370/238 |
| 6,724,722 B1 | 4/2004 | Wang et al. | |
| 6,728,265 B1 | 4/2004 | Yavatkar et al. | |
| 6,738,349 B1 * | 5/2004 | Cen | 370/231 |
| 6,760,314 B1 | 7/2004 | Iwata | |
| 6,785,237 B1 * | 8/2004 | Sufleta | 370/236 |
| 6,801,502 B1 * | 10/2004 | Rexford et al. | 370/235 |
| 6,831,890 B1 * | 12/2004 | Goldsack et al. | 370/229 |
| 6,831,893 B1 | 12/2004 | Ben Nun et al. | |
| 6,842,783 B1 | 1/2005 | Boivie et al. | |
| 6,857,025 B1 | 2/2005 | Maruyama et al. | |
| 6,904,020 B1 * | 6/2005 | Love et al. | 370/252 |
| 6,947,379 B1 * | 9/2005 | Gleichauf et al. | 370/229 |
| 6,954,431 B2 * | 10/2005 | Roberts | 370/235 |
| 7,065,482 B2 * | 6/2006 | Shorey et al. | 709/224 |
| 7,133,365 B2 | 11/2006 | Klinker et al. | |
| 7,164,657 B2 | 1/2007 | Phaal | |
| 7,185,079 B1 | 2/2007 | Bainbridge et al. | |
| 2001/0021176 A1 * | 9/2001 | Mimura et al. | 370/235 |
| 2001/0037387 A1 | 11/2001 | Gilde et al. | |
| 2002/0010765 A1 | 1/2002 | Border | |
| 2002/0010792 A1 | 1/2002 | Border et al. | |
| 2002/0040400 A1 | 4/2002 | Masters | |
| 2002/0057699 A1 * | 5/2002 | Roberts | 370/395.32 |
| 2002/0075813 A1 | 6/2002 | Baldanadao et al. | |
| 2002/0078223 A1 | 6/2002 | Baldonado et al. | |
| 2002/0103846 A1 | 8/2002 | Zisapel et al. | |
| 2002/0105909 A1 * | 8/2002 | Flanagan et al. | 370/230 |
| 2002/0105911 A1 | 8/2002 | Pruthi et al. | |
| 2002/0110084 A1 | 8/2002 | Butt et al. | |
| 2002/0141378 A1 * | 10/2002 | Bays et al. | 370/351 |
| 2002/0145981 A1 * | 10/2002 | Klinker et al. | 370/244 |
| 2002/0163884 A1 * | 11/2002 | Peles et al. | 370/229 |
| 2002/0184393 A1 * | 12/2002 | Leddy et al. | 709/250 |
| 2002/0186661 A1 | 12/2002 | Santiago et al. | |
| 2003/0002443 A1 * | 1/2003 | Basso et al. | 370/237 |
| 2003/0012145 A1 * | 1/2003 | Bragg | 370/254 |
| 2003/0016627 A1 * | 1/2003 | MeLampy et al. | 370/235 |
| 2003/0074449 A1 | 4/2003 | Smith et al. | |
| 2003/0076840 A1 | 4/2003 | Rajagopal et al. | |
| 2003/0079005 A1 | 4/2003 | Myers et al. | |
| 2003/0086422 A1 | 5/2003 | Klinker | |
| 2003/0088529 A1 | 5/2003 | Klinker | |
| 2003/0088671 A1 | 5/2003 | Klinker | |
| 2003/0118029 A1 * | 6/2003 | Maher et al. | 370/395.21 |
| 2003/0133443 A1 | 7/2003 | Klinker et al. | |
| 2003/0214913 A1 * | 11/2003 | Kan et al. | 370/252 |
| 2004/0196787 A1 * | 10/2004 | Wang et al. | 370/229 |
| 2004/0258226 A1 | 12/2004 | Host | |
| 2007/0140128 A1 | 6/2007 | Klinker et al. | |

FOREIGN PATENT DOCUMENTS

| | | |
|---|---|---|
| EP | 1063818 | 12/2000 |
| JP | 11027327 | 1/1999 |
| JP | 2001024699 | 1/2001 |
| WO | WO-98/58474 | 12/1998 |
| WO | WO-99/27684 | 6/1999 |
| WO | WO-02/084951 | 10/2002 |
| WO | WO-03/040874 | 5/2003 |
| WO | WO-03/040947 | 5/2003 |
| WO | WO-03/041342 | 5/2003 |
| WO | WO-2004/040423 | 5/2004 |

OTHER PUBLICATIONS

International Search Report for PCT/US02/11357 mailed Aug. 19, 2002.

International Search Report for PCT/US02/35158 mailed Dec. 23, 2002.

International Search Report for PCT/US02/35488 mailed Feb. 13, 2003.

Written Opinion for PCT/US02/11357 mailed Apr. 16, 2003.

International Search Report for PCT/US02/35156 mailed May 30, 2003.

International Preliminary Examination Report for PCT/US02/11357 mailed Oct. 1, 2003.

International Search Report for PCT/US03/34446 mailed May 26, 2004.

Supplementary European Search Report from the European Patent Office mailed Aug. 22, 2005.

Official Action of Japanese Patent Office mailed Sep. 11, 2007.

Official Action of Japanese Patent Office mailed Dec. 19, 2006.

* cited by examiner

PASSIVE ROUTE CONTROL OF DATA NETWORKS

CROSS-REFERENCES TO RELATED REFERENCES

This application incorporates each of the following by reference for all purposes:

U.S. Non-Provisional Patent Application entitled, "System and Method to Assure Network Service Levels with Intelligent Routing," having U.S. patent application Ser. No. 09/833,219 and filed Apr. 10, 2001;

U.S. Non-Provisional Patent Application entitled, "System and Method to Provide Routing Control of Information Over Data Networks," having U.S. patent application Ser. No. 10/013,809 and filed Dec. 7, 2001;

U.S. Non-Provisional Patent Application entitled, "System and Method to Provide Routing Control of Information Over Networks," having U.S. patent application Ser. No. 10/040,902 and filed Dec. 28, 2001; and U.S. Provisional Patent Application entitled, "System and Method to Assure Network Service Levels and Bandwidth Management with Intelligent Routing," having U.S. Provisional Patent Application No. 60/350,186 and filed Nov. 2, 2001.

BACKGROUND

The present invention relates generally to routing of data over networked communication systems, and more specifically to controlled routing of data over networks, such as Internet Protocol ("IP") networks or the Internet, using passive flow techniques for analyzation.

One such data network is the Internet, which is increasingly being used as a method of transport for communication between companies and consumers. Performance bottlenecks have emerged over time, limiting the usefulness of the Internet infrastructure for business-critical applications. These bottlenecks occur typically at distinct places along the many network paths to a destination from a source. Each distinct bottleneck requires a unique solution.

The "last mile" bottleneck has received the most attention over the past few years and can be defined as bandwidth that connects end-users to the Internet. Solutions such as xDSL and Cable Internet access have emerged to dramatically improve last mile performance. The "first mile" bottleneck is the network segment where content is hosted on Web servers. First mile access has improved, for example, through the use of more powerful Web servers, higher speed communications channels between servers and storage, and load balancing techniques.

The "middle mile," however, is the last bottleneck to be addressed in the area of Internet routing and the most problematic under conventional approaches to resolving such bottlenecks. The "middle mile," or core of the Internet, is composed of large backbone networks and "peering points" where these networks are joined together. Since peering points have been under-built structurally, they tend to be areas of congestion of data traffic. Generally no incentives exist for backbone network providers to cooperate to alleviate such congestion. Given that over about 95% of all Internet traffic passes through multiple networks operated by network service providers, just increasing core bandwidth and introducing optical peering, for example, will not provide adequate solutions to these problems.

Peering is when two Network Service Providers ("NSPs"), or alternatively two Internet Service Providers ("ISPs"), connect in a settlement-free manner and exchange routes between their subsystems. For example, if NSP1 peers with NSP2 then NSP1 will advertise only routes reachable within NSP1 to NSP2 and vice versa. This differs from transit connections where full Internet routing tables are exchanged. An additional difference is that transit connections are generally paid connections while peering points are generally settlement-free. That is, each side pays for the circuit or route costs to the peering point, but not beyond. Although a hybrid of peering and transit circuits (i.e., paid-peering) exist, only a subset of full routing tables are sent and traffic sent into a paid-peering point is received as a "no change." Such a response hinders effective route control.

Routes received through peering points are one Autonomous System ("AS") away from a Border Gateway Protocol ("BGP") routing perspective. That makes them highly preferred by the protocol (and by the provider as well since those connections are cost free). However, when there are capacity problems at a peering point and performance through it suffers, traffic associated with BGP still prefers the problematic peering point and thus, the end-to-end performance of all data traffic will suffer.

Structurally, the Internet and its peering points include a series of interconnected network service providers. These network service providers typically maintain a guaranteed performance or service level within their autonomous system (AS). Guaranteed performance is typically specified in a service level agreement ("SLA") between a network service provider and a user. The service level agreement obligates the provider to maintain a minimum level of network performance over its network. The provider, however, makes no such guarantee with other network service providers outside their system. That is, there are no such agreements offered across peering points that link network service providers. Therefore, neither party is obligated to maintain access or a minimum level of service across its peering points with other network service providers. Invariably, data traffic becomes congested at these peering points. Thus, the Internet path from end-to-end is generally unmanaged. This makes the Internet unreliable as a data transport mechanism for mission-critical applications. Moreover, other factors exacerbate congestion such as line cuts, planned outages (e.g., for scheduled maintenance and upgrade operations), equipment failures, power outages, route flapping and numerous other phenomena.

Conventionally, several network service providers attempt to improve the general unreliability of the Internet by using a "Private-NAP" service between major network service providers. This solution, however, is incapable of maintaining service level commitments outside or downstream of those providers. In addition the common technological approach in use to select an optimal path is susceptible to multi-path (e.g., ECMP) in downstream providers. The conventional technology thus cannot detect or avoid problems in real time, or near real time.

Additionally, the conventional network technology or routing control technology operates on only egress traffic (i.e., outbound). Ingress traffic (i.e., inbound) of the network, however, is difficult to control. This makes most network technology and routing control systems ineffective for applications that are in general bi-directional in nature. This includes most voice, VPN, ASP and other business applications in use on the Internet today. Such business applications include time-sensitive financial services, streaming of on-line audio and video content, as well as many other types of applications. These shortcomings prevent any kind of assurance across multiple providers that performance will be either maintained or optimized or that costs will be minimized on end-to-end data traffic such as on the Internet.

In some common approaches, it is possible to determine the service levels being offered by a particular network service provider. This technology includes at least two types. First is near real time active calibration of the data path, using tools such as ICMP, traceroute, Sting, and vendors or service providers such as CQOS, Inc., and Keynote, Inc. Another traditional approach is real time passive analysis of the traffic being sent and received, utilizing such tools as TCPdump, and vendors such as Network Associates, Inc., Narus, Inc., Brix, Inc., and P-cube, Inc.

These conventional technological approaches, however, only determine whether a service level agreement is being violated or when network performance in general is degraded. None of the approaches to conventional Internet routing offer either effective routing control across data networks or visibility into the network beyond a point of analysis. Although such service level analysis is a necessary part of service level assurance, alone it is insufficient to guarantee SLA performance or cost. Thus, the common approaches fail to either detect or to optimally avoid Internet problems such as chronic web site outages, poor download speeds, jittery video, and fuzzy audio.

It is noteworthy that many traditional route control techniques rely on active probes or other additional traffic to be injected into a network to provide candidate path information to form the basis of an intelligent route update. At times this additional traffic may not scale, may clog nearby network circuits, may be difficult to configure and maintain, and may cause potential security notifications near the remote probe destination. These notifications result in administrative overheard due to interactions with the remote security departments.

The first complication associated with active probes is to configure the existing network to allow the probes to override the default routing behavior. The network engineer is forced to configure all existing network infrastructure to support probe based route control. That configuration is not necessarily easy to accomplish. In addition, as the underlying network changes, the configuration of the route control probes may need to change along with it, thus creating a maintenance overhead.

Another common problem with active probes is the impact they can have on the remote destination, especially with respect to security policy. Given the volume of active probes that often must be sent to collect sufficient performance information, these active probes can often be mistaken for denial of service attacks. Oftentimes the port numbers used by the active probes can be mistaken for a port scan. These common Internet "attacks" are often detected automatically by security devices such as firewalls and intrusion detection systems. Often these devices are not sophisticated enough to distinguish a harmless network probe from a legitimate attack. As such, route control can often trigger false security alarms at the destination being optimized. This results in administrative overhead in handling each and every security complaint.

Active probes, while useful for many applications, represent additional traffic to be sent over the network. This overhead can be significant if the number of destinations being probed is large or the size of the circuits is small. For example, common probe techniques for 10,000 destinations can fill an entire T1 circuit. This overhead is wasted bandwidth that is not communicating relevant application information.

Therefore, it is desired to have a method of candidate path information collection that is completely passive, non-intrusive to both source and destination, and that provides relevant and timely candidate performance information for the purpose of route control.

SUMMARY OF THE INVENTION

Therefore, there is a need in the art for a system and a method to overcome the above-described shortcomings of the conventional approaches and to effectively and efficiently control routing of data over multiple networks. Accordingly, there is a need to provide intelligent routing control to network users, such as Internet users, to ensure that a particular path used to transport data is selected such that the particular path maintains at least an acceptable level of performance and/or cost across multiple networks.

In one embodiment according to the present invention, there is provided a method of routing data between a first point and a second point, the method comprising passively monitoring at least one data flow characteristic associated with a data flow on a first path, comparing the at least one data flow characteristic, associated with the data flow on the first path, to an associated data flow requirement of a policy, switching the data flow to a second path if the at least one data flow requirement is not met, passively monitoring at least one data flow characteristic associated with the data flow on the second path, and comparing the at least one data flow characteristic associated with the data flow on the second path with the associated data flow requirement of the policy.

In another embodiment, there is provided a method of routing data between a first point and a second point. The method comprises passively monitoring at least one data flow characteristic associated with a data flow on a plurality of paths, where each of the plurality of paths is monitored over non-overlapping periods of time, and switching the data flow to at least one of the plurality of paths.

In another embodiment, there is provided a method of routing data between a first point and a second point. The method comprises splitting a path into at least two paths, passively monitoring at least one data flow characteristic associated with the at least two paths to determine respective values of a data flow characteristic for each of the at least two paths, and comparing the values to each other.

In another embodiment, there is provided a method of routing data between a first point and a second point. The method comprises splitting a prefix data flow into a first sub-prefix data flow and a second sub-prefix data flow, passively monitoring at least one data flow characteristic associated with the first sub-prefix data flow to determine a first value of a usage characteristic, passively monitoring at least, one data flow characteristic associated with the second sub-prefix data flow to determine a second value of the data flow characteristic, comparing the first value with the second value, and selecting the second sub-prefix data flow if the second value represents improved performance over the first value.

DETAILED DESCRIPTION OF THE SPECIFIC EMBODIMENTS

Detailed descriptions of the embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process or manner.

Figure 1A:
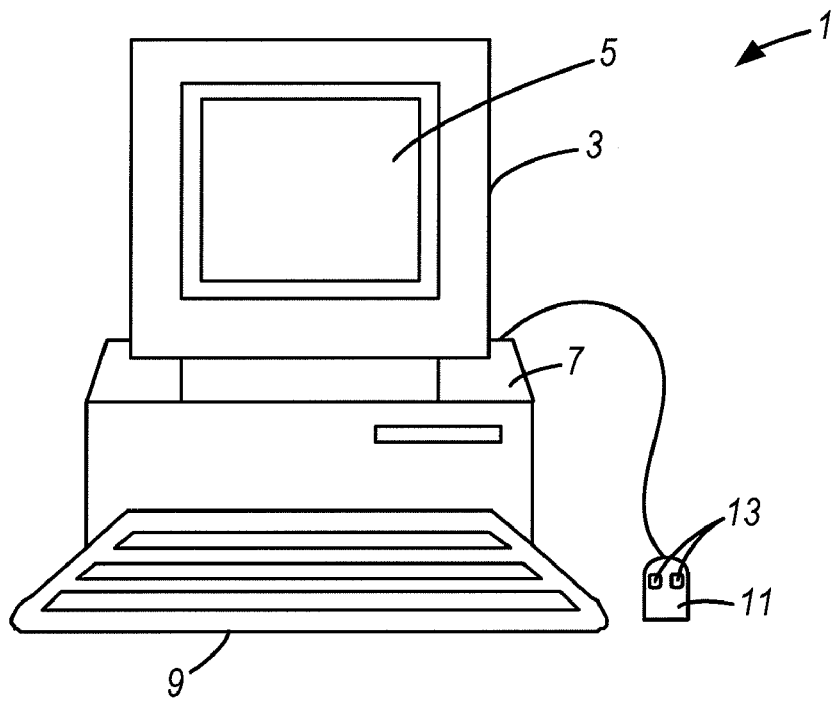
FIG. 1A is an exemplary computer system for presenting to a user a user interface suitable to practice an embodiment of the present invention.
Figure 1B:
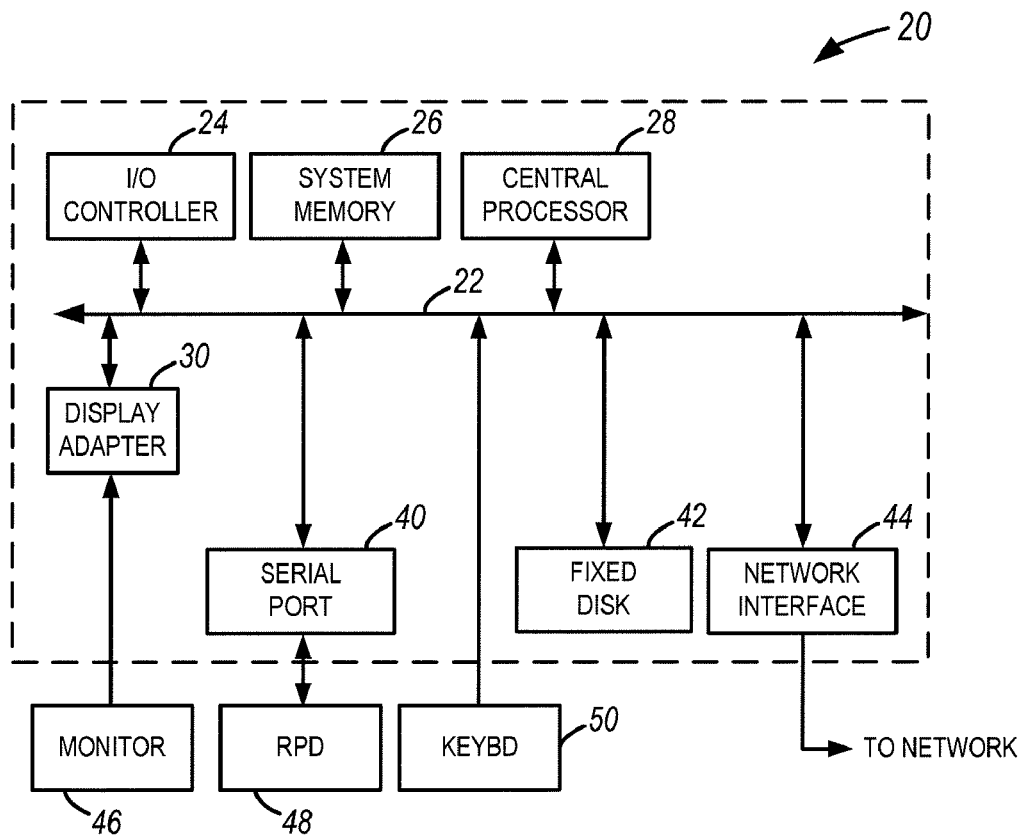
FIG. 1B shows basic subsystems in the computer system of FIG. 1A.
Figure 1C:
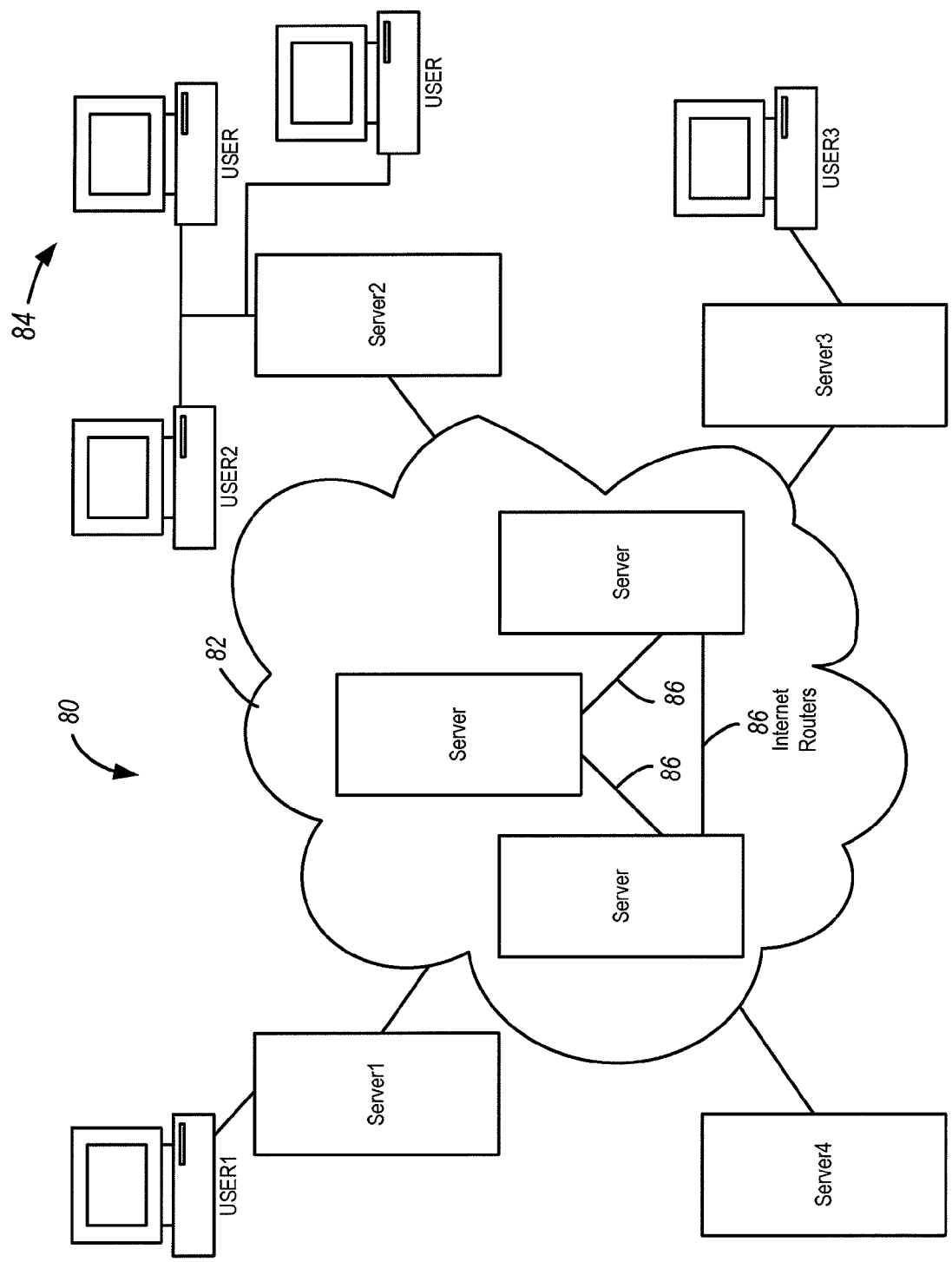
FIG. 1C is a generalized diagram of one exemplary computer network suitable for use with the present invention.

FIGS. 1A, 1B, and 1C illustrate basic hardware components suitable for practicing a specific embodiment of the present invention. FIG. 1A is an illustration of an exemplary computer system 1 including display 3 having display screen 5. Cabinet 7 houses standard computer components such as a disk drive, CD-ROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, voice or visual recognition, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1B illustrates subsystems that might typically be found in a computer such as computer 1. In FIG. 1B, subsystems within box 20 are directly interfaced to internal bus 22. Such subsystems typically are contained within the computer system such as within cabinet 7 of FIG. 1A. Subsystems include input/output (I/O) controller 24, System Memory (or random access memory "RAM") 26, central processing unit CPU 28, Display Adapter 30, Serial Port 40, Fixed Disk 42, Network Interface Adapter 44 (e.g., Network Interface Card, or NIC), which in turn is configured to communicate with a network, such as by electrical, radio, or optical means known in the art. The use of bus 22 allows each of the subsystems to transfer data among subsystems and, most importantly, with the CPU, where the CPU might be a Sparc™, an Intel CPU, a PowerPC™, or the equivalent. External devices can communicate with the CPU or other subsystems via bus 22 by interfacing with a subsystem on the bus. Thus, Monitor 46 connects with Display Adapter 30, a relative pointing device (e.g. a mouse) connects through a port, such as Serial Port 40. Some devices such as Keyboard 50 can communicate with the CPU by direct means without using the main data bus as, for example, via an interrupt controller and associated registers.

As with the external physical configuration shown in FIG. 1A, many subsystem configurations are possible. FIG. 1B is illustrative of but one suitable configuration. Subsystems, components or devices other than those shown in FIG. 1B can be added. A suitable computer system also can be achieved using fewer than all of the sub-systems shown in FIG. 1B. For example, a standalone computer need not be coupled to a network so Network Interface 44 would not be required. Other subsystems such as a CD-ROM drive, graphics accelerator, etc. can be included in the configuration without affecting the performance of the system of the present invention.

FIG. 1C is a generalized diagram of a typical network that might be used to practice an embodiment of the present invention. In FIG. 1C, network system 80 includes several local networks coupled to computer data network 82, such as the Internet, WAN (Wide Area Network), or similar networks. Network systems as described herein refer to one or more local networks and network service providers that make up one or more paths from a source to a destination and visa versa. Network systems, however, should be understood to also denote data networks that include one or more computing devices in communication using any networking technology. Although specific network protocols, physical layers, topologies, and other network properties are presented herein, the present invention is suitable for use with any path-diverse network (e.g., a multi-homed network interconnected to other networks), especially those networks that employ Internet Protocol (IP) for routing data, such as flows having one or more packets of information according to the protocol. Furthermore, although a specific implementation is not shown in FIG. 1C, one having ordinary skill in the art should appreciate that a flow control system according to the present invention can be deployed within one or more data networks 82 or configured to operate with network system 80.

In FIG. 1C, computer USER1 is connected to Server1, wherein the connection can be by any network protocol, such as Ethernet, Asynchronous Transfer Mode, IEEE standard 1553 bus, modem connection, Universal Serial Bus, etc. The communication link need not be a wire but can be infrared, radio wave transmission, etc. As depicted, Server1 is coupled to the data network 82, such as the Internet or, for example, any other data network that uses Internet Protocol for data communication. The data network is shown symbolically as a collection of server routers 82.

The exemplary use of the Internet for distribution or communication of information is not strictly necessary to practice the present invention but rather is merely used to illustrate a specific embodiment. Further, the use of server computers and the designation of server and client machines are not crucial to an implementation of the present invention. USER1 Computer can be connected directly to the Internet. Server1's connection to the Internet is typically by a relatively high bandwidth transmission medium such as a T1 line, a T3 line, Metro Area Ethernet, or the like, although it might be connected in a similar fashion as with USER1. Similarly, other computers 84 are shown utilizing a local network (e.g., Local Area Network, or LAN) at a different location from USER1 Computer. The computers at 84 are coupled via Server2 to the Internet. Although computers 84 are shown to include only a single server (e.g., Server2), two or more servers can be connected to the local network associated with computers 84. The USER3 and Server3 configuration represent yet a third network of computing devices.

Figure 1D:
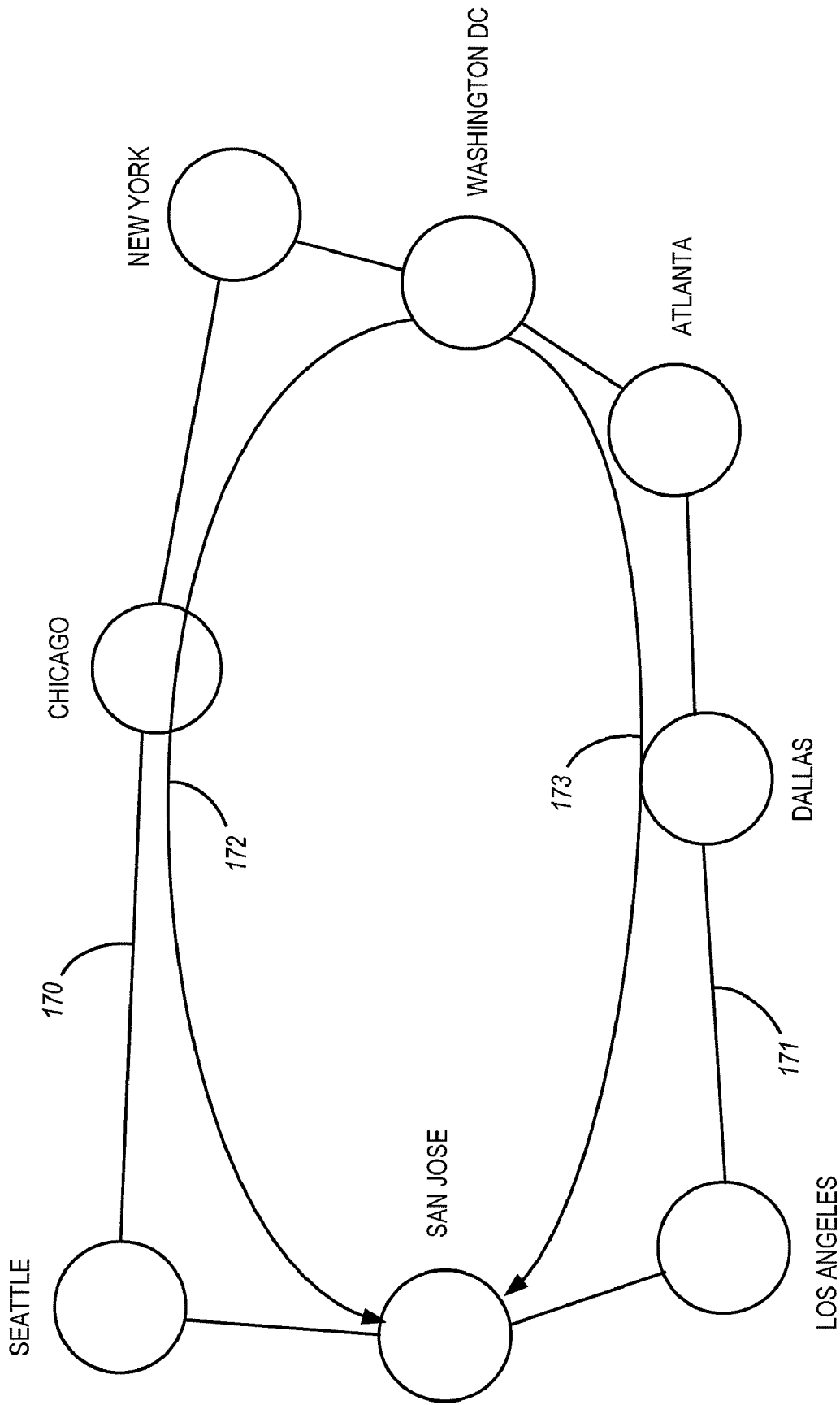
FIG. 1D depicts a typical data network using multi-path.

FIG. 1D shows the effects of typical multi-path (e.g., ECMP) techniques on a route control system using active calibration alone. Two possible paths exist between Washington D.C. and San Jose for a given network service provider. The first path 170 traverses New York, Chicago and Seattle. The second path 171 traverses Atlanta, Dallas, and Los Angeles. Suppose that the cost of using either of the paths is equal in the routing protocol. Most router vendors, when presented with two equal costs paths, will load share traffic between them making sure that paths in the same flow will follow the same route. The path selection process is vendor-specific and generally relies on known source and destination IP addresses. Unless the source IP address and destination IP address are the same, the traffic may take a different equal-cost path. The implications for path calibration are that the active probes sent across the network between Washington D.C. and San Jose may take the northern path through Chicago 172 while the customer's traffic may take the southern path through Dallas 173, because while the destination IP address is the same, the source IP address is different. Thus, the path measured may not be the path that is actually taken by the customer's traffic. The present invention, among other things, intelligently controls routes containing data traffic using a system and a technique to assure service levels of customer data traffic in accordance with the present invention.

Figure 1E:
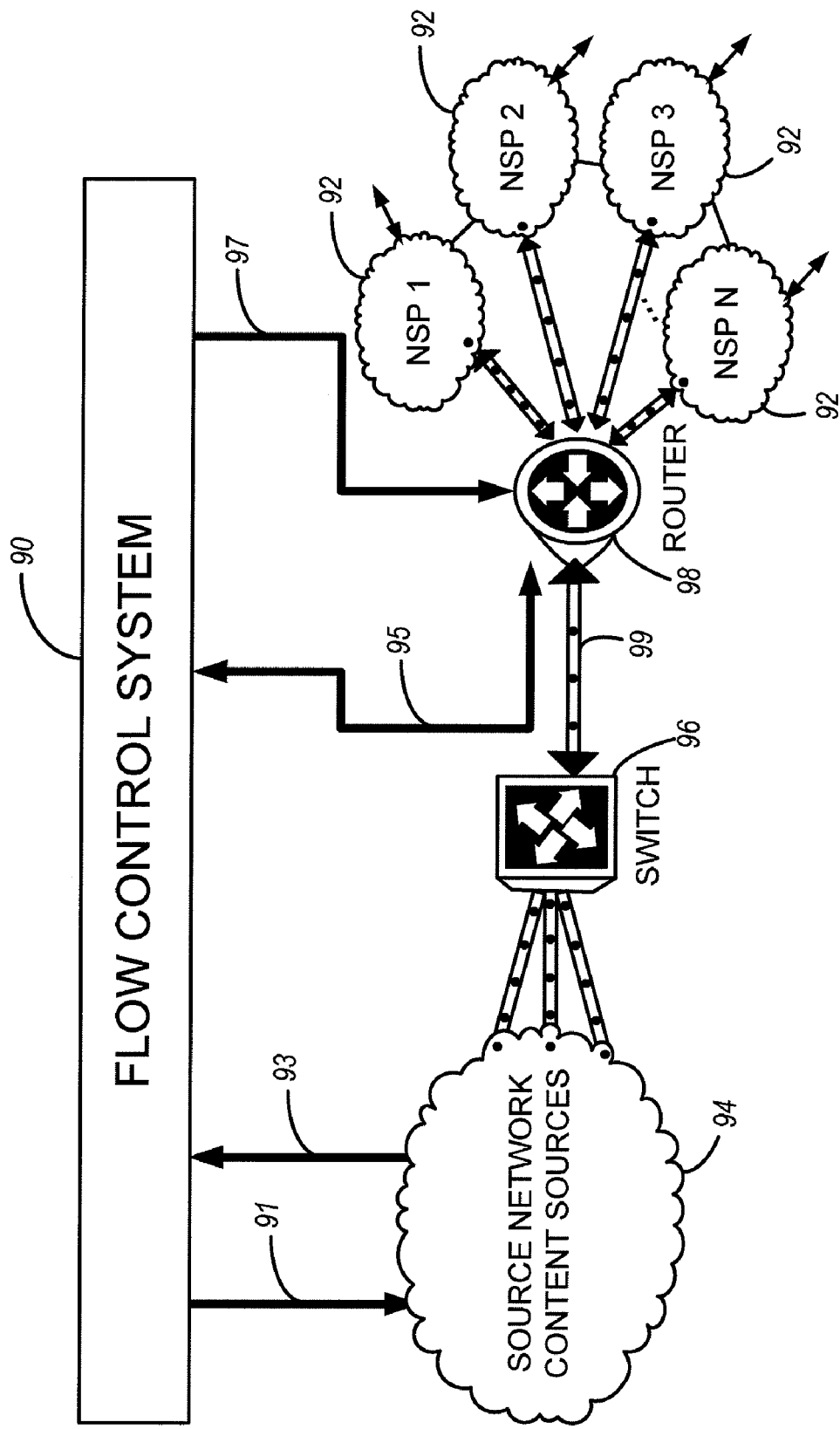
FIG. 1E illustrates a simplified data network and flow control system in accordance with a specific embodiment of the present invention.

FIG. 1E illustrates an exemplary data network within a portion of a network system 80 of FIG. 1C including NSPs 92, and a flow control system in accordance with a specific embodiment of the present invention. Exemplary flow control system 90 is configured to communicate with one or more network elements of the data network. Although flow control system 90 is shown external of and in communication with the elements of source network 94, switch 96, and router 99, flow control system 90 can be wholly embodied in any of the elements shown, or alternatively, can be distributed, in portions, over each of the elements. In another embodiment, flow control system 90 resides on one or more servers or network elements within exemplary source network 94.

An exemplary data network includes one or more source networks 94. A source network 94 typically is a local network including one or more servers owned and operated by application service providers, managed service providers, content delivery networks, web hosting companies, individual enterprises, corporations, entities and the like. Such service providers typically communicate information to users that are further removed from the multi-homed network service providers 92, such as NSP 1, NSP 2, NSP 3, . . . and NSPn. In one example, network service providers 92 are coupled to a source network or source point as to be considered a first set of data networks. These NSPs, or first set of data networks, are in turn coupled to a second set of networks, wherein the second set is connected to multiple other networks, thus establishing one or more paths from a source to a destination. A path as described herein can be a route from a first point (e.g., source) to a second point (e.g., destination), and is divided into segments, where each segment resides wholly within a provider.

The multiple connections between router 98 and multiple network service providers 92 provide an operator of source network 94 to direct data traffic according to the best performing network service provider. Switch 96 operates to transfer bi-directional data 99, such as IP data, bi-directionally from source network 94 to router 98. Although a single router and switch are shown, one having ordinary skill in the art will appreciate that either additional routers and switches or other suitable devices can be substituted according to another embodiment of the present invention. Moreover, switch 96 need not be used to practice the subject invention. In a specific embodiment, router 98 includes one or more routers running an exemplary protocol, such as Border Gateway Protocol (e.g., BGP4, such as Cisco™ or Juniper™ implementations), for example, and preferably has route visibility across multiple network service providers.

In an embodiment of flow control system 90, system 90 operates to measure end-to-end (i.e., source to destination and destination to source) data traffic 95 in terms of flow characteristics, such as performance, cost, bandwidth, and the like. Flow control system 90 also generates statistics associated with data paths across multiple network service providers in real time, or near-real time. Such statistics are communicated to source network 94 for providing network engineering personnel, for example, with report information 91 such that on-the-fly reports are created to provide information related to route-change activity, traffic performance as delivered to selected destinations and transit provider usage (i.e., bandwidth), cost, and the like.

In one embodiment of the present invention, a local computing device uses report information 91 from system 90 to generate visual and graphical representations on, for example, a user-friendly interface ("UI") where the representations are indicative of data traffic along one or more paths (e.g., paths between a source and a destination). Network personnel, or any entity responsible with flow control, with access to source network 94 then can provide control information 93 to flow control system 90 to modify system operation by, for example, changing data traffic flow from a under-performing current, or default, path to a better performing path. Intervention by network personnel, however, is not necessary for flow control system 90 to operate in accordance with the present invention.

Flow control system 90 further functions to compare specific data traffic flows (i.e., both uni- and bi-directional traffic flows outbound from and inbound into the data network) to determine whether a particular traffic flow meets one or more rules of an associated flow policy. A flow policy, as referred to herein, includes a set of one or more rules that is associated with a particular data traffic flow related to particular system user (e.g., as denoted by IP address prefix).

A rule, or criterion, is a minimum level, a maximum level or a range of values that defines acceptable routing behavior of an associated with a traffic flow characteristic. For example, a rule can set: the maximum acceptable cost, with or without regard to network service provider cost; the maximum load or bandwidth usage associated with traffic flows through specific providers; a range of acceptable (or non-acceptable) service providers; the maximum acceptable latency or loss over one or more paths across multiple network service providers; acceptable ranges of performance for each network service provider, such as maximum burst limits, minimum performance commitments and range of costs (i.e., cost structures with regards to time of day, type of traffic, etc.); and any other data flow characteristic that can influence the measurement or the control of data traffic.

Flow control system 90 further operates to detect when one or more rules, or flow policies, are violated and then to take remedial action. That is, flow control system 90 enforces policies associated with data traffic flow by correcting detrimental deviations in performance (i.e., service level assurance), costs or bandwidth (i.e., load in terms of percent capacity available per path). Flow control system 90 makes such corrections based on real- or near-real time traffic analysis, local path diversity (i.e., modifying one or more egress paths from a data network), and visibility into downstream available paths. For example, for a destination related to a specific traffic flow, flow control system 90 directs, or re-directs, traffic to one or more alternative paths to resolve a particular flow's deviation in terms of flow characteristics, from its flow policy.

Figure 2:
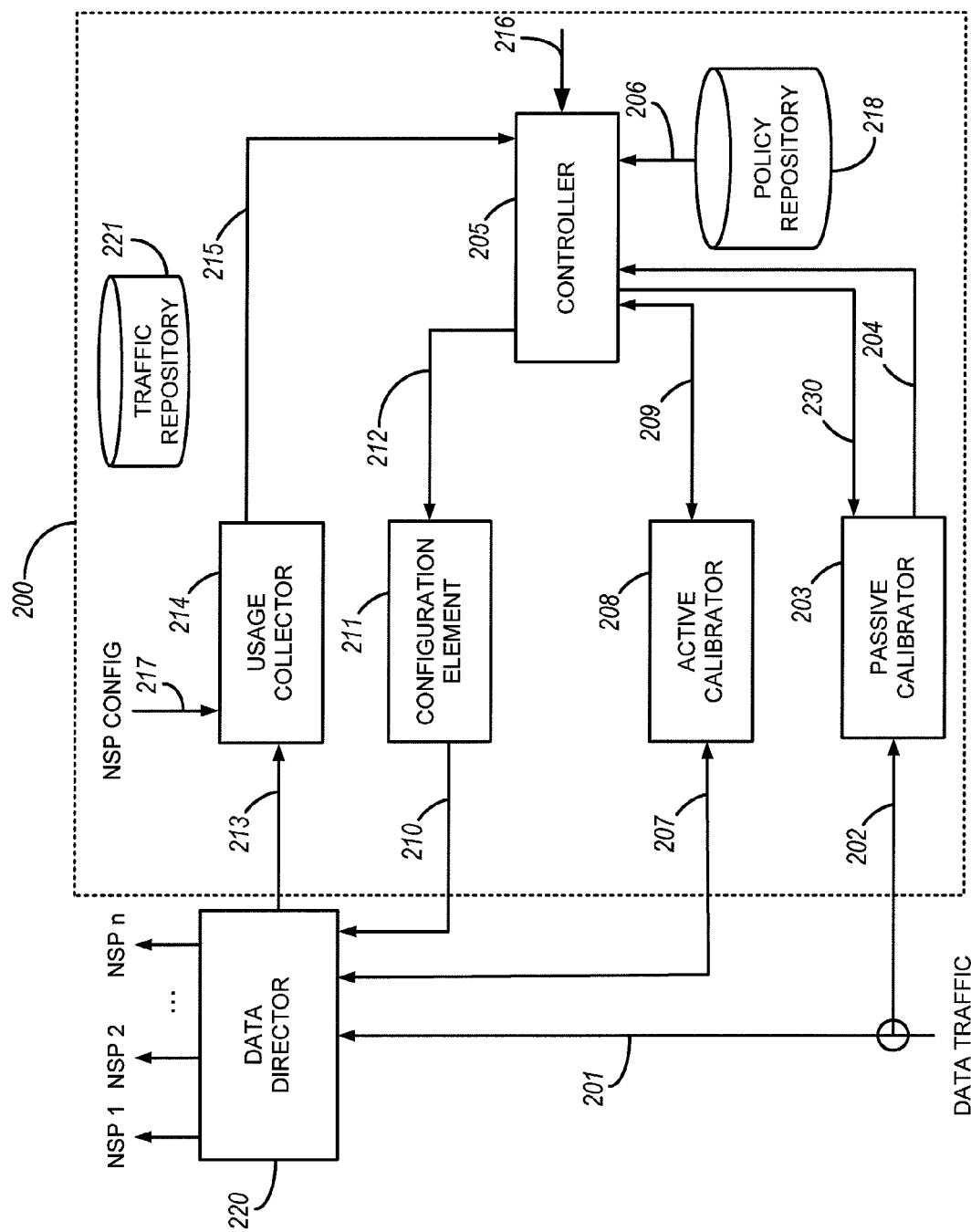
FIG. 2 is a simplified block diagram of one embodiment of a flow control system according to one embodiment the present invention.

FIG. 2 illustrates a specific embodiment of flow control system 90 of FIG. 1D. In another embodiment, flow control system in FIG. 2 is a reactive flow control system. That is, a reactive flow control system is designed to react to policy violations indicating sub-standard routing of data traffic over one or more data networks or service providers (i.e., addresses pass-fail criteria) rather than optimizing performance at some targeted level of acceptable operation.

Flow control system 200 includes controller 205, passive calibrator 203, active calibrator 208, configuration element 211, and usage collector 214, each of which can be realized in hardware, software, or a combination thereof. For example, controller 205, passive calibrator 203, active calibrator 208, configuration element 211, and usage collector 214 are software modules designed to perform specific processes, as described herein, in accordance to the present invention. Such modules can reside in one or more computing devices, such as the computing devices shown in FIG. 1A, or alternatively, over one or more USER-type machines (i.e., servers) coupled over a data network or network system.

Exemplary passive calibrator 203, active calibrator 208 and usage collector 214 are coupled to controller 205 to, in part, provide flow characteristics of data traffic. Controller 205 receives monitored flow characteristics as well as flow policies to be enforced. Controller 205 is configured to determine if a flow policy is violated, and upon detection of such a violation, then to select a remedial action to resolve the violation. Configuration element 211 is coupled to controller 205 to receive information to initiate remedial actions and is configured to communicate such actions to data director 220. Thereafter, data director 220 implements the corrective action to resolve the pending violation, for example, by changing the traffic flow from the current path to a better performing path.

Additionally, flow control system 200 includes traffic repository 221 and flow policy repository 218. Exemplary traffic repository 221 and flow policy repository 218 are databases, such as a storage device, configured to store a large number of records in one or more data structures. Traffic repository 221 is designed to store and to communicate information related to traffic and route characteristics, and flow policy repository 218 is designed to store and to communicate policy information or rules to govern the performance and cost of each of the data traffic flows. One having ordinary skill in the art of database management should appreciate that many database techniques may be employed to effectuate the repositories of the present invention.

In operation, flow control system 200 of FIG. 2 monitors egress and ingress data flow 201, such as IP data traffic, to determine whether data flow 201 to and from source network is within the performance tolerances set by the associated flow policy. Flow control system 200, in one embodiment, receives data flow 201 by replication, such as by a network switch, by using a splitter, such as an optical splitter, or any other tapping means know to those having ordinary skill in the art. Data flow 202, which is exactly, or near exactly, the same as the information contained within data flow 201, is provided to passive calibrator 203.

Passive calibrator 203 monitors the data traffic of data flow 201 and communicates information 204 related to the traffic and traffic performance to controller 205. Controller 205 is configured to receive policy data 206 representing one or more policies that correspond to a particular traffic flow, such as a particular data flow. Moreover, the particular data flow can be associated with a certain user identified by a destination prefix, for example. From policy data 206, controller 205 determines the levels of performance, cost, or utilization that the particular traffic is to meet. For example, controller 205 determines whether a particular traffic flow of data flow 201 is meeting defined performance levels (i.e., service levels) as defined by one or more requirements or criteria, such as inbound and outbound network latency, packet loss, and network jitter.

Active calibrator 208 functions to send and to receive one or more active probes 207, of varying types, into and from the data networks. These probes are designed to measure network performance including, path taken across one or more available providers (i.e., to determine if a provider is a transit AS rather than peer AS), next hop-in-use, and other network parameters. To activate active calibrator 208, controller 205 sends an active probe request 209 to active calibrator 208. Such a request is required if controller 205 determines that additional information regarding alternative paths or network system characteristics are necessary to better enforce policies in reactive flow control systems, or alternatively, to prevent such policy violations optimized flow control systems.

Usage collector 214 is configured to receive NSP data 217 representing one or more network provider configurations. Generally, such configurations include the number of paths ("pipes") associated with each provider and the size thereof. Additionally, NSP data 217 can relate to a provider's cost or billing structure and can also include each provider's associated set or subset of addresses, each provider's billing methods (i.e., byte/min, etc.), etc. Moreover, usage collector 214 is configured to collect usage information 213 from the network elements, such as switches, border routers, provider gear, and other devices used to transport data over data networks. Usage collector 214 is configured to provide controller 205 with provider utilization and billing information 215, which represents aggregated data based upon NSP data 217 and usage information 213. Utilization and billing information 215 includes data that represents cost, billing, utilization, etc., for each network service provider of interest.

One having ordinary skill in the art should appreciate that NSP data 217 can be provided to usage collector 214 in a variety of ways. For example, the data can be provided the data paths used by the data flows or can be provided by an entity having authority to do so, such a network engineer entering the data into a computing device in source network 94 of FIG. 1E.

Moreover, usage collector 214 is configured to monitor usage characteristics defining a network service provider's data traffic capacity, costs, etc. Usage information 213 provided to usage collector 214 includes usage characteristics from network elements, such as switches, border routers, routers, provider gear, and other devices used to transport data over data networks. Usage refers to the data (i.e., raw data such as X Mb samples at time(0)) that represents instantaneous or near instantaneous measurement of characteristics (i.e., usage characteristics) that define, for example, the load and available capacity of each network service provider. Utilization is the usage rate over time. For example, suppose the usage collector monitoring NSP1 measures its utilization, or capacity over time, as X Mb at time(0) and Y Mb at time(1). This raw data, or usage, is used to calculate utilization, or usage rate for NSP1 (e.g., Y−X/time(1)−time(0)). Bandwidth is the total capacity each path or segment of path available for traffic flow. In one embodiment, the usage can be measured in any segment in any path at any number of hops or networks from a first point. Load is typically defined as the amount of capacity a particular path is used to carry data traffic and can be expressed as load/bandwidth.

Usage collector 214 is designed to generate utilization and billing information 215 based upon usage information 1213 and NSP data 217. Since each of the providers has different cost and billing structures, as well as methods of determining usage costs, usage collector 214 operates to aggregate usage information 213 accordingly to provide controller 205 with utilization and billing information 215.

Usage collector 214 then provides the utilization billing information 215 to controller 205 for each network service provider of interest. One having ordinary skill in the art should appreciate that the usage collector can provide additional information based upon the provider usage information, to the controller, as needed to better effectuate route control.

Controller 205 collects information (i.e., aggregated performance and usage characteristics) from each of passive calibrator 203, active calibrator 208, usage collector 214, and optionally traffic repository 221. Based upon the information collected, controller 205 determines a course of action that best alleviates the policy violations in respect to the information represented by policy data 206 that is conveyed to controller 205. Once the course of action is determined, controller 205 initiates and sends a network routing change request 212 to configuration element 211. In a specific embodiment, controller 205 also provides data representing one or more alternate data paths that can be used to resolve the policy violation.

Configuration element 211 is designed to communicate routing changes in the network to data director 220. Once configuration element 211 sends one or more routing changes, data director 220 then moves data flow 201 from a current path to another path (e.g., from NSP1 to NSPn or a first path of NSP1 to a second path of NSP1). Data director 220 thus operates to distribute traffic to these destinations across multiple network service provider links based on, for example, the cost and performance measured across each link.

In operation, configuration element 211 communicates one or more routing changes 210 with data director 220, for example, by using a routing protocol such as BGP. Configuration element 211 functions to dynamically control routing behavior by modifying the source address of the traffic passing through configuration element 211. The source address is modified in a way that improves application performance as well as cost requirements.

The following discussion is a more detailed description of each of the elements of an exemplary control system 200. Referring back to active calibrator 208, active calibrator 208 provides active mechanisms within system 200 for determining the nature of downstream or upstream paths. This information is typically not available in any conventional protocol used on data networks such as the Internet, and must be collected external to the normal processes of networking. As shown in FIG. 2, active calibrator 208 is coupled to controller 205 to provide at least a destination prefix that is not meeting the policy requirements, such as minimum performance level. Once received, active calibrator 208 then initiates a calibration process that determines most or all of the available network paths to the destination address as well as performance levels. Controller 205 is designed to select the most suitable probes that active calibrator 208 is to use, based on the particular policy requiring enforcement or correction, and thereafter to initiate active probing of network paths using active calibrator 208.

In one embodiment, active calibration probes are communicated to available network or Internet paths via probe path 207. The returning active calibration probes enter via probe path 207 into active calibrator 208. Active calibrator then forwards probe information 209 to controller 205, which contains performance information including alternate available paths. Controller 205 then determines how best to enforce the specifics of the policy associated with the subject traffic flow. Exemplary active calibrator 208 employs active calibration mechanisms to provide, for example, long term statistics.

In another embodiment of the present invention, active calibrator 208 resides in data director 220 within, or alternatively, can be integrated into controller 205. There are several proprietary implementations of commercially available routers suitable to practice the present invention. One example of suitable active probes is the RMON probe. Cisco systems use Service Assurance Agent ("SAA") that is derived from the remote monitoring ("RMON") probes to send out active probes. SAA allows routers to measure and report network-originated application round trip times. Although not every probe mentioned below is available in SAA for network calibration, one skilled in the art would appreciate how each of the following might be implemented to practice one or more embodiments of the present invention.

An exemplary active calibrator 208 can use ICMP (Internet Control Message Protocol) echo request or other ping-type probes, lightweight TCP-based probes, Sting probes, "pathchar" probes, lightweight probes using User Datagram Protocol ("UDP") packets with a predefined TTL (time to live), traceroute probes, or other active probes that are suitable for use by active calibrator 208 in accordance with the present invention.

These probes are received back by active calibrator 208 of FIG. 2 and are sent out by their source addresses. Such probes are all sourced and received on an exemplary stats computer system resident, for example, in the local premises, or as a stats process on a router. In another embodiment, active calibrator and its use of probes operate in accordance to probes described in a U.S. Patent Application, entitled "System and Method to Assure Network Service Levels with Intelligent Routing," having U.S. patent application Ser. No. 09/833,219 and filed on Apr. 10, 2001, and is incorporated by reference for all purposes.

Exemplary passive calibrator 203 of FIG. 2 is configured to receive, without interfering with, network communication data 20i, such as customer network or Internet traffic. Network communication data path 201 (i.e., IP data traffic), as monitored by passive calibrator 203, includes the default or currently routed path of the data traffic and is provided to passive calibration element 203 from data director 220. The currently routed path is, for example; the path (e.g., hop-by-hop) between routers that a packet would take, as determined by standard routing protocols. Passive calibrator 203 is coupled (i.e., electrically, optically, by radio waves, etc.) to controller 205 to provide information which indicates whether the specific IP data traffic is within the range of acceptable performance metrics, such as determined by a flow policy. Passive calibrator 203 operates to instantaneously monitor all traffic received via data flow 202 and is designed to overcome the complications of relying solely on active traffic analysis, such as EMCP, as shown with respect to FIG. 1D. When the controller addresses policy violations, for example, passive calibrator 203 operates to overcome the complications of performing only active traffic analysis in the presence of multi-path (e.g., ECMP).

In another embodiment of the present invention, passive calibrator 203 examines the traffic stream in both directions (i.e., ingress and egress) and classifies each of the traffic streams into flows. Traffic flows, are monitored within passive calibrator 203 according to the underlying protocol state (e.g., such as regarding TCP sessions) over time. For example, passive calibrator 203 classifies the traffic flow according to round trip latency, percentage of packets lost, and jitter for each of the traffic routes or flows. Such traffic route information is used to characterize the "end-to-end" performance of the paths carrying the traffic flows, which includes flow rates, and is aggregated into a series of network prefixes.

As described above, passive calibrator 203 is coupled to store, fetch and update traffic and route information stored in traffic repository 221 (connection not shown). Exemplary traffic repository 221 is a database configured to store and to maintain data representing traffic and route information that is useful to the end user employing a flow control system, such as system 200 of FIG. 2, as well as the operators of, for example, an network service provider. The data within traffic repository 221 includes long term statistics about the traffic. These statistics will be used for reporting, analysis purposes, and providing general feedback to a user of a flow control system according to the present invention.

Such feedback will consist, for example, of types of traffic being sent, source addresses, destination addresses, applications, traffic sent by ToS or DSCP ("DiffServ Code Point") setting (which might be integrated into a differentiated billing system), and volume of traffic. These statistics are fed into traffic repository 221 where, for example, a reporting engine or some other analysis process has access to them. The information stored in traffic repository 221 is data representing such traffic route characteristics arranged in any suitable data structure as would be appreciated by one skilled in the art.

Figure 3:
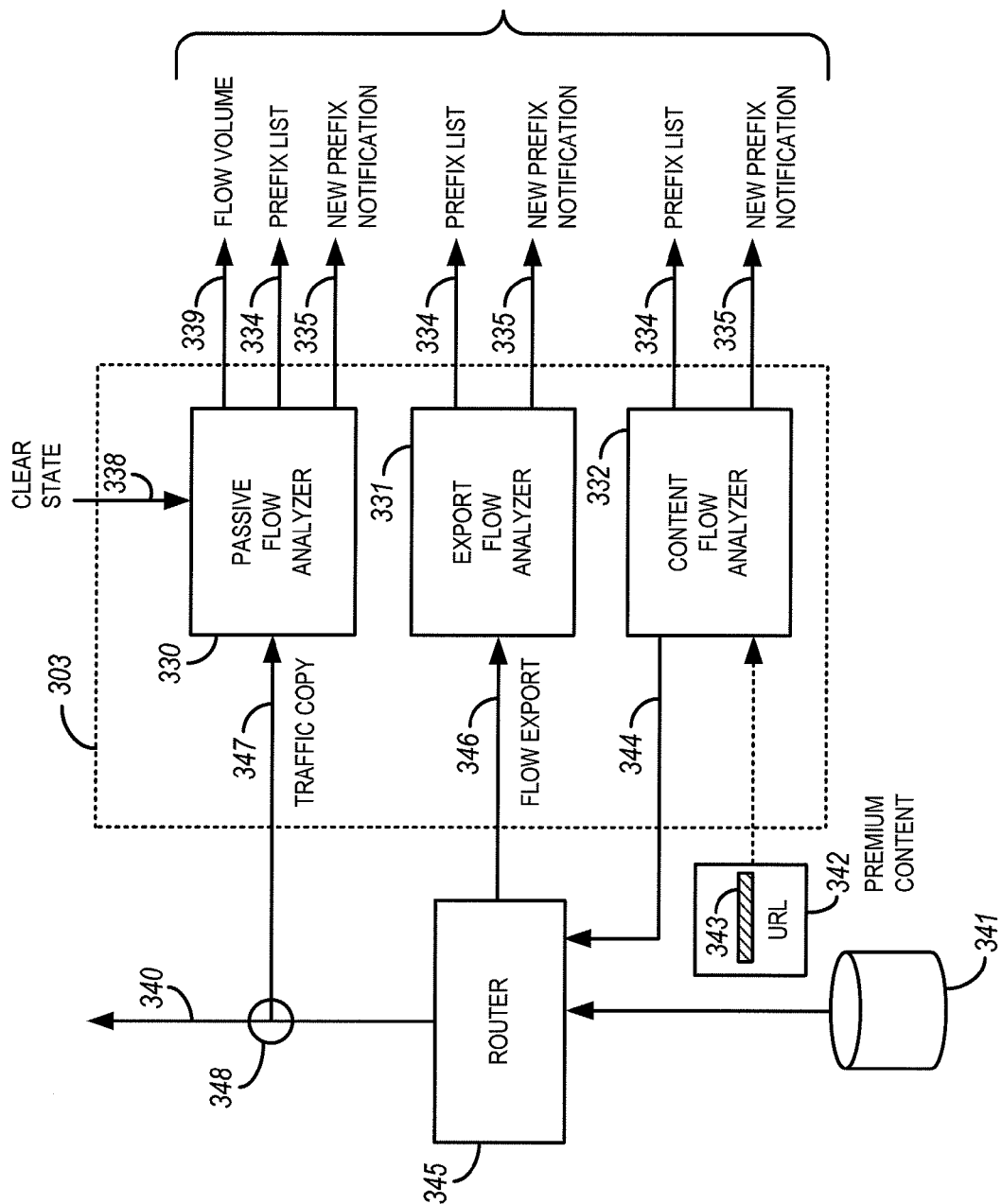
FIG. 3 is a functional block diagram of an exemplary passive calibrator of FIG. 2.

FIG. 3 is a detailed functional block diagram showing exemplary elements of a passive calibrator 303 according to an embodiment of the present invention. Passive calibrator 303 includes, for example, passive flow analyzer 330, export flow analyzer 331, and content analyzer 332.

In one embodiment, passive flow analyzer 330 performs passive analysis on the traffic to monitor current traffic flow characteristics so the controller can determine whether the monitored current traffic flow meets associated policy requirements. Export flow analyzer 331 performs passive analysis on exported flow records from a network device, such as from those devices (e.g., router) that advertise traffic type, source and destination addresses, and other information related to the traffic that it travels across service provider links. An example of such a network device is Cisco's Netflow™ product. In another embodiment, passive flow analyzer 330 operates in accordance to the passive flow analyzer described in the above-mentioned U.S. patent application Ser. No. 09/833,219.

Content Flow Analyzer 332 performs passive analysis of specific elements of data content, such as web site content. Export flow analyzer 331 and content flow analyzer 332 determine a set of relevant prefixes or a prefix list 334 that is associated with a specific user's policy. Prefix list 334 is sent as data representing such prefixes to an active detection process in the controller. Prefix list 334 can be one or more lists or data structures configured to store data representing performance and usage characteristics and is designed to receive a query, for example, by the controller. Once queried, the passive flow analyzer provides the one or more prefix lists, or portions thereof, to the controller for use in determining a policy violation, for determining which routes or path comply with the flow policy, which path is the optimum path for routing data, and the like. An exemplary prefix list that can be generated by export flow analyzer 331 and content flow analyzer 332, as well as passive flow analyzer 330.

Figure 17:
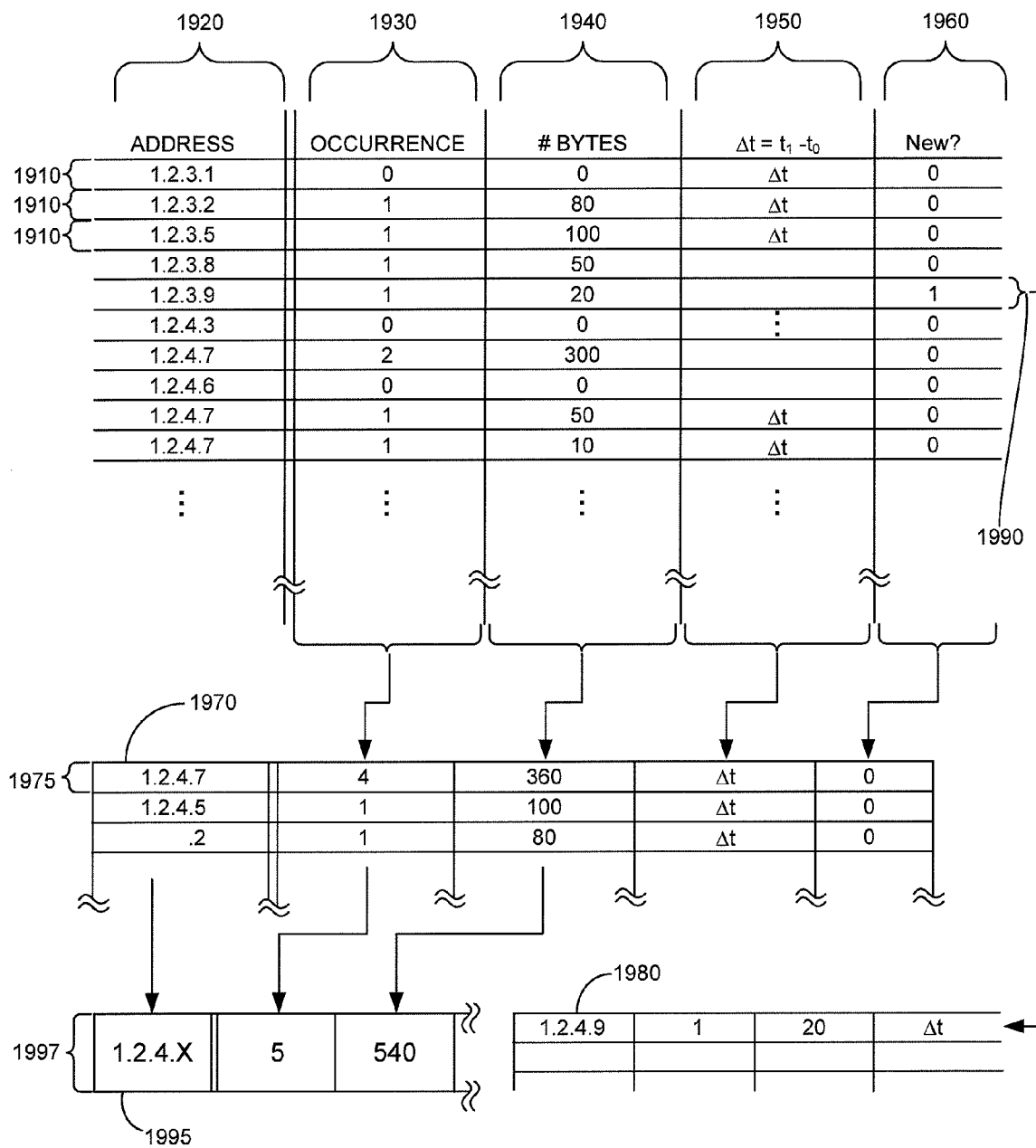
FIG. 17 is a representation of an exemplary address or prefix list according to an embodiment of the present invention.

FIG. 17 shows an exemplary data structure 1900 suitable for providing for one or more of the prefix lists described herein. Data structure, or list, 1900 includes many IP addresses 1920 with many records 1910 associated with each address (e.g., destination) or prefix of variable granularity.

Each record 1910 includes an address 1920 (or prefix), a number of occurrences during a time period 1930, number of bytes sampled 1940, time interval in which sampling occurred (delta t) 1950, new prefix flag 1960 (1 represents new prefix, 0 represents old prefix), or the like.

List 1970 includes aggregate flow information for each address 1920 or prefix. For example, record 1975 includes the following data: for address 1.2.4.7, this address was monitored four times during the sampling time interval (delta)t with a total flow volume of 360 bytes. With record 1990 having a new prefix flag set (i.e., first time this address has been monitored), new prefix list 1980 includes address 1.2.4.9 having one occurrence (first time) over (delta)t interval. One having ordinary skill in the art should appreciate that other relevant data may be monitored and can be stored in list 1900. Moreover, the data representing address, occurrence, number of bytes, time interval, etc., can be used to manipulate the data such in a way that the controller can easily obtain.

For example, the data stored within a list 1920 can be aggregated or grouped according to address or prefix. As shown in FIG. 17, aggregate list 1995 includes the group of addresses corresponding to 1.2.4.X. For example, the record 1997 of aggregate addresses contains data indicating that the aggregation of addresses had been monitored five times during the time interval and had a total volume of 540 bytes. One having ordinary skill in the art should appreciate that addresses or prefixes can be grouped or aggregated in many ways.

Export flow analyzer 331 and content flow analyzer 332 also are configured to notify controller 305 when a previously unseen prefix has been added to the prefix list 334. New prefix notification signal 335 enables the control element 1005 to establish a new baseline performance for this prefix and to seed the routing table with a non-default route, or alternative route (i.e., non-BGP), if necessary. In one embodiment, export flow analyzer 331 and content flow analyzer 332 provide for monitoring of performance characteristics.

Content flow analyzer 332 is typically used when the main source of traffic flow 340 is web site or other content. Content source 341 can be configured such that special or premium content 342 that must be optimized can be identified by the flow control system by using, for example, an embedded URL 343. URL 343 redirects the client to a small content server running on the content flow analyzer 332. Content flow analyzer 332 receives a request for the small content element, which is generally a small image file (e.g., 1×1 GIF) and is invisible or imperceptible in relation with the main original content, and responds to the client with the small content element 344. Content flow analyzer 332 then stores or logs this transaction, and by using these logs, content flow analyzer 332 is able to perform aggregation and assemble content prefix list 334. The list 334 is passed along to controller 205, for example, for active service level monitoring and policy enforcement.

Figure 4:
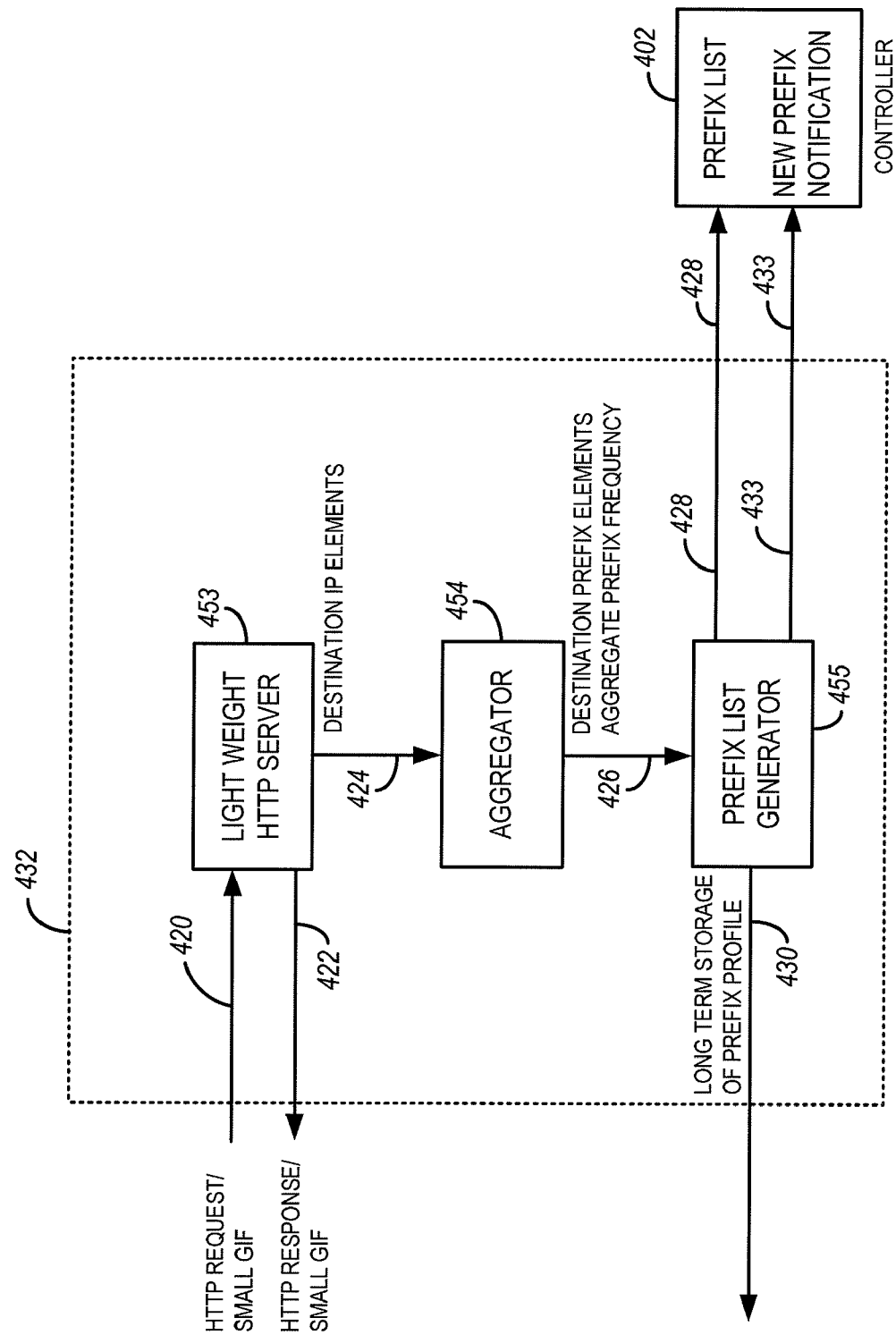
FIG. 4 is a functional block diagram of an exemplary content flow analyzer of FIG. 3.

FIG. 4 illustrates a functional block diagram of an exemplary content flow analyzer 432. Content flow analyzer 432 handles requests 420 for a small element of content, which is, for example, a 1×1 pixel image file that is imperceptible (although it need not be) on the resulting page. The small element is associated with the premium or generally specific pages of a larger set of content. The small element is, for example, a small redirect URL embedded within the content.

The small redirect URL acts to generate an HTTP request 420 in response to the small element of content. Content flow analyzer 432 sees this request 420 and responds 422 to it with, for example, a lightweight HTTP server 453. This server is fast and lightweight, and does nothing other than respond with the image file. The lightweight web server 453 logs the IP address of the client requesting the web page, and sends the one or more addresses to aggregator 454. Aggregator 454 aggregates, or collates, individual IP elements 424 into prefixes of varying granularity (e.g., /8 through /32) and also aggregates the frequency that each prefix is seen over an interval of time.

That is, aggregator 454 classifies prefixes according to its frequency of occurrence and provides aggregated (i.e., grouped) prefixes 426 to prefix list generator 455. Prefix list generator 455 creates destination prefix list 428 according, for example, to a prefix's importance in relation to the overall operation of the system as defined by the aggregated or grouped prefixes 426. For example, each monitored traffic flow is examined to determine the performance characteristics associated with a destination prefix or address.

Aggregate prefixes 426 are generally classified in terms of flow frequency, and average or total flow volume. Prefix list generator 455 sends updates to current prefix list 428 to controller 205 of FIG. 2, and also notifies other elements of the system with new prefix notification signal 432 when a new prefix is observed. Prefix list generator 455 stores the prefix information 430 to persistent storage for reporting and analysis purposes. A new prefix provides an additional alternate path or path segment that was unknown up until a certain point of time. The new alternate path or path segment associated with the new prefix can provide for flow policy compliance, and thus can be used to re-route or alter routing of data to obviate a policy violation.

Referring back to FIG. 3, export flow analyzer 331 operates in conjunction with network elements that can export (i.e., communicate) flow information in a format useable by analyzer 331. One exemplary format is the Cisco NetFlow™ export format. Any network element designed to export flow information, such as router 345 or a layer 2 switch, thus is also configured to passively monitor the traffic it is processing and forwards export records 346 to export flow analyzer 331. Export flow analyzer 331 functions to process export flow records 346, aggregates the flows into prefix elements, and generates prefix list 334. The prefix list is generally a subset of all prefixes observed by the flow control system. A prefix is selected from all prefixes based upon flow volume and flow frequency over an observation period. The selected prefix then is placed into prefix list 334 before the list passed along to controller 205 of FIG. 2, for example.

Figure 5:
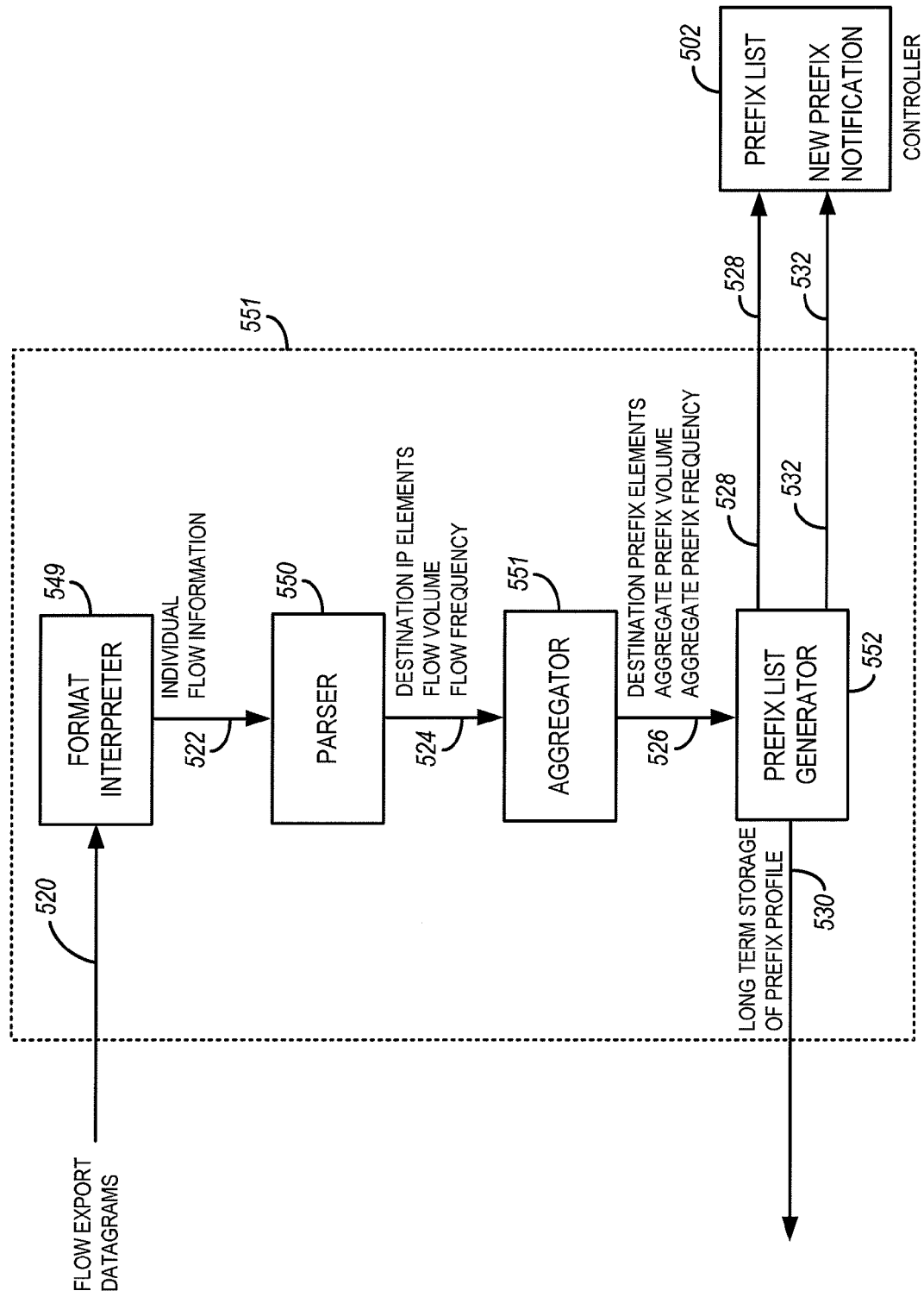
FIG. 5 is a functional block diagram of an export flow analyzer of FIG. 3 in accordance to one embodiment of the present invention.

FIG. 5 illustrates a functional block diagram of exemplary export flow analyzer 531. Export flow analyzer 531 includes format interpreter 549, parser 550 and prefix list generator 552. Format interpreter 549 is configured to receive export flow datagrams 520 from the network elements designed to send them. Format interpreter 549 then communicates individual flow information 522 to parser 550. Parser 550 operates to interpret destination IP elements from the flows monitored by the passive calibrator. Parser 550 also aggregates traffic flow according to total flow volume or transportation rate (e.g., in bytes/time unit) as well as flow frequency of destination addresses, for example, into aggregate elements. Thereafter, parser 550 sends the aggregate elements 524 to aggregator 551. Aggregator 551 then generates prefix-level destination information 526 (i.e., aggregate prefix volume and frequency) at a variety of prefix granularities (e.g., from /8 up through /32). In other words, aggregator 551 determines the frequency, session, or for a specific prefix and the aggregate volume of occurrences related to that prefix over an observed time interval.

Destination prefix list 528 is generated by prefix list generator 552 by, for example, ranking and organizing traffic flow characteristics related to prefixes in order of relative importance. List 528 contains data representing an aggregation of prefixes prefix list 528 and is organized in determines the relevance, as determined by the system or an entity to ensure policy enforcement. For example, one or more prefixes can be ordered in terms of flow frequency and average or total flow volume in relation together prefixes available in the overall system. Prefix list generator 552 sends updates to the current prefix list to controller 205 of FIG. 2 and also notifies other elements of the system when a new prefix is observed via a new prefix notification signal 532. Prefix list generator 552 stores all prefix information 530 to persistent storage for reporting and analysis purposes.

Figure 6:
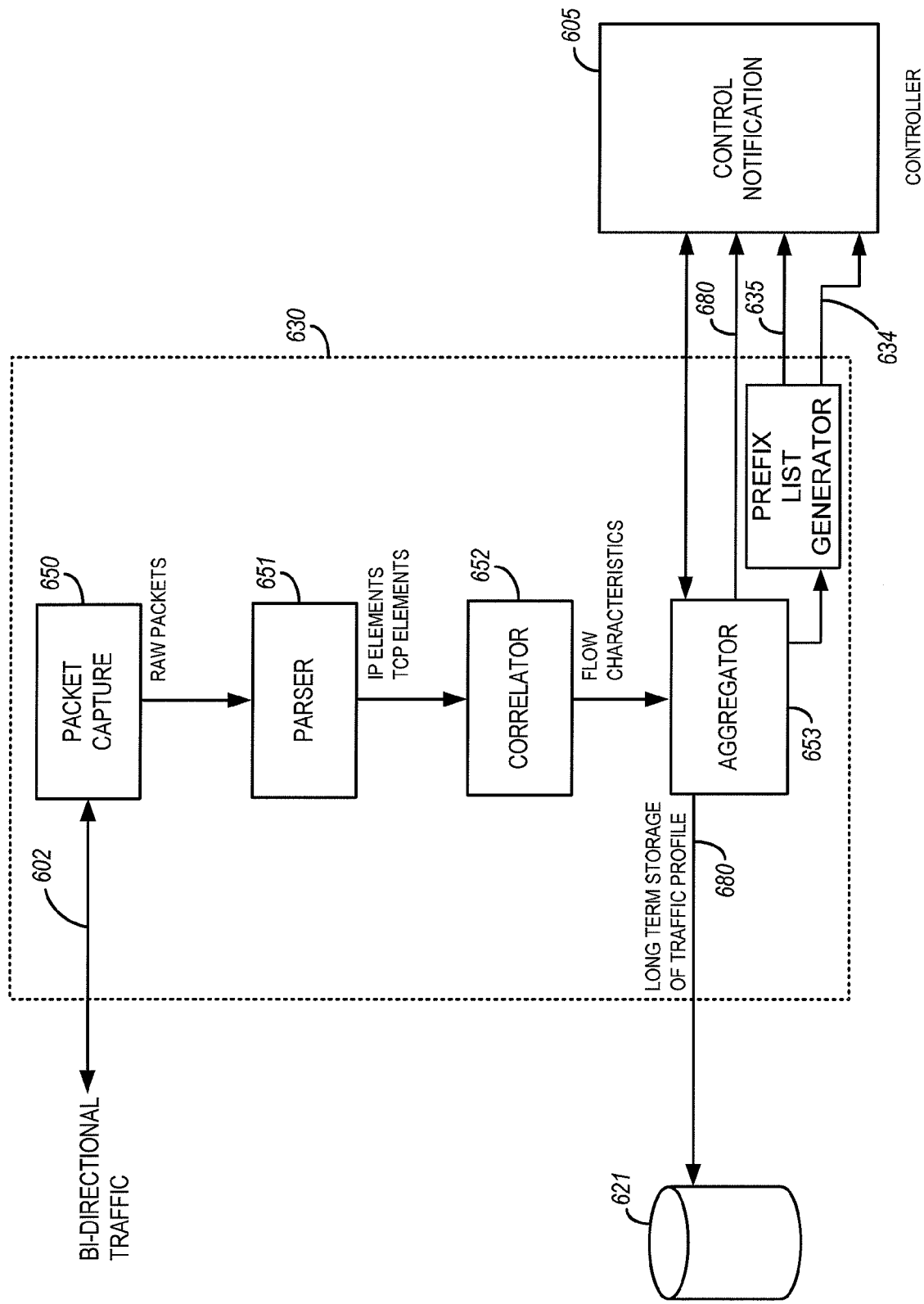
FIG. 6 is a functional block diagram of a passive flow analyzer of FIG. 3 according to a specific embodiment.

FIG. 6 illustrates a function block diagram of an exemplary passive flow analyzer 630 of FIG. 3. In one embodiment, passive flow analyzer 630 is designed to generate prefix list 634 and new prefix notification signal 635 and generates aggregated flow data 680, including network performance and usage statistics grouped into relevant characteristics. For example, prefixes of a certain size can be aggregated, or grouped, from highest traffic volume to lowest as observed over time. The aggregated flow data 680 is communicated to controller 605 and are used by the controller to determine whether the current traffic flow violates or fails to conform to an associated flow policy for a given destination. The passive flow analyzer 630 also functions to store aggregated flow data 680 in traffic repository 621, where it can be used for characterizing historical route and traffic flow performance. In another embodiment of the present invention, a prefix list generator is not included in the passive flow analyzer of FIG. 6.

Passive Flow Analyzer 630 uses a copy of the traffic 602 via a passive network tap or spanned switch port, as shown in FIG. 2, to monitor the network performance for traffic. Passive flow analyzer 630 also can monitor and characterize UDP traffic patterns for detection of anomalous behavior, such as non-periodic traffic flow, or the like. Passive flow analyzer 630 can use various neural network techniques to learn and understand normal UDP behavior for the application in question, and indicate when that behavior has changed, possibly indicating a service level violation which can be verified or explained with well known active probing techniques.

Additionally, passive flow analyzer 630 is designed to be "application-aware" according how each of the particular traffic flows is classified. Traffic can be classified according to the classifier described in the above-mentioned U.S. patent application Ser. No. 09/833,219. That it, Passive flow analyzer 630 can inspect the payload of each packet of traffic 602 to interpret the performance and operation of specific network applications, such as capture and interpretation of the Realtime Transport Control Protocol ("RTCP") for voice over IP ("VoIP"), for example.

In FIG. 6, passive flow analyzer 330 includes packet capture engine 650, packet parser 651, correlation engine 652, and aggregator 653. Packet capture engine 650 is a passive receiver configured to receive traffic (e.g., IP data traffic) coming into and out of the network. Capture of traffic is used to facilitate traffic analysis and for determining a whether a current traffic route meets minimum service levels or policy requirements. Packet capture engine 650 is designed to remove one, several or all packets from a traffic stream, including packets leaving the network and entering the network. Packet capture engine 250 operates to remove certain packets up, for example, from the network drivers in the kernel into user space by writing custom network drivers to capture part of a packet. Using DMA, the partial packet can be copied directly into user space without using the computer CPU. Such packets are typically removed according to one or more filters before they are captured. Such filters and the use thereof are well known in the art and can be designed to, for example, remove all types of TCP traffic, a specific address range or ranges, or any combination of source or destination address, protocol, packet size, or data match, etc. Several common libraries exist to perform this function, the most common being "libpcap." Libpcap is a system-independent interface for packet capture written at the Lawrence Berkeley National Laboratory. Berkeley Packet Filter is another example of such capture program.

Parser 651 is coupled to receive captured raw packets and operates to deconstruct the packets and retrieve specific information about the packet from each in the traffic flow. Exemplary parser 651 extracts information from the IP and TCP headers. Such extracted information from the IP headers include source and destination IP addresses, DSCP information encoded in the ToS (i.e., "type of service") bits, and the like. DSCP carries information about IP packet QoS requirements. Each DSCP defines the Per Hop Behavior of a traffic class. DiffServ has 64 code points so that it can define 64 different types of traffic classifications. TCP header information includes source and destination port numbers, sequence number, ACK number, the TCP flags (SYN, ACK, FIN etc.), the window size, and the like.

TCP elements parsed from the TCP headers are especially useful in determining whether a policy is being enforced, in terms of performance. An increasing amount of traffic, however, does not rely on TCP and instead uses UDP. UDP does not contain the necessary information to determine service levels according to conventional approaches.

To determine service levels to these destinations, the present invention might employ a statistically relevant amount of collateral TCP traffic going to the same prefix or a series of active probes to the same destinations, or have the analyzer parse deeper into the packet and understand the traffic at the application layer (e.g., layer 7). There are some protocols running on UDP that have very specific requirements that are different from most other data traffic on the network. These protocols are loosely classified as "real-time" protocols and include things like streaming media and Voice over IP ("H.323"). Packet loss and latency, below a certain level, are secondary concerns for real-time protocols.

Most importantly, however, is reducing the variance in inter-packet arrival times (i.e., network jitter). Many real time protocols such as H.323 report the observed jitter in back channel communication known as the RTCP ("Real-Time Transport Control Protocol"), which is used to distribute time-dependent media data via IP multicast with feedback. If passive flow analyzer 630 of FIG. 3 is "application-aware," it can capture and observe the contents of the RTCP and be aware when the underlying network path is not meeting minimum jitter requirements. This could trigger an SLA violation in the same manner that 30% packet loss would.

Correlator 652 operates to interpret and to group the packet elements (e.g., TCP and IP) from the packets to determine the current service level of the flow and then groups the packets into a specific traffic flow. Flows are reconstructed, or grouped, by matching source and destination IP addresses and port numbers, similar to the process of stateful monitoring of firewalls. Correlator 252 determines the current service level by measuring several traffic characteristics during a TCP transaction. For example, correlator 252 determines the round trip time ("RTT") incurred on a network, and hence, this serves as a measure of latency for the network traffic.

Figure 7:
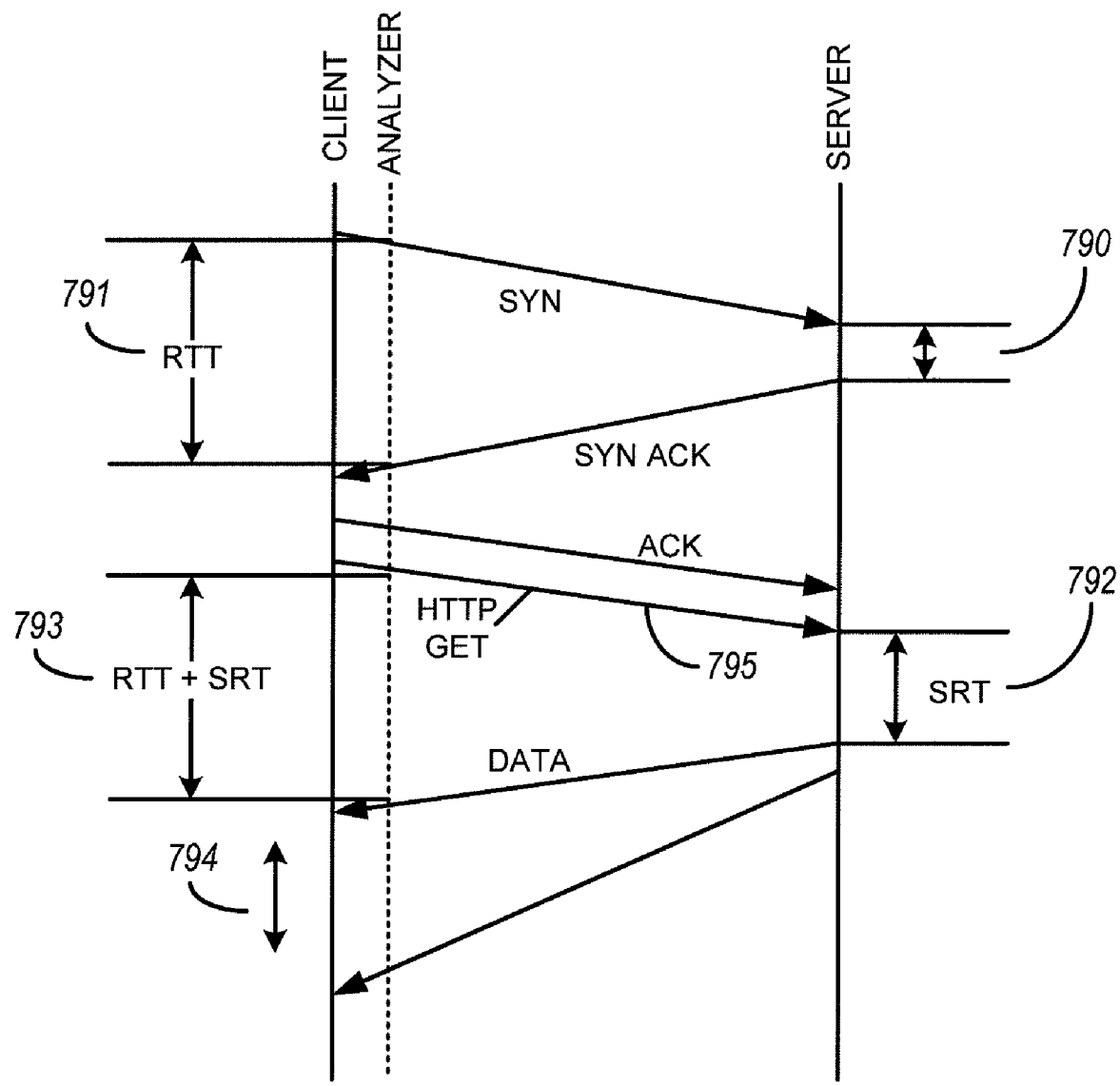
FIG. 7 is a simplified timing diagram of determining network performance metrics with an exemplary flow control system located near a client or a source.
Figure 8:
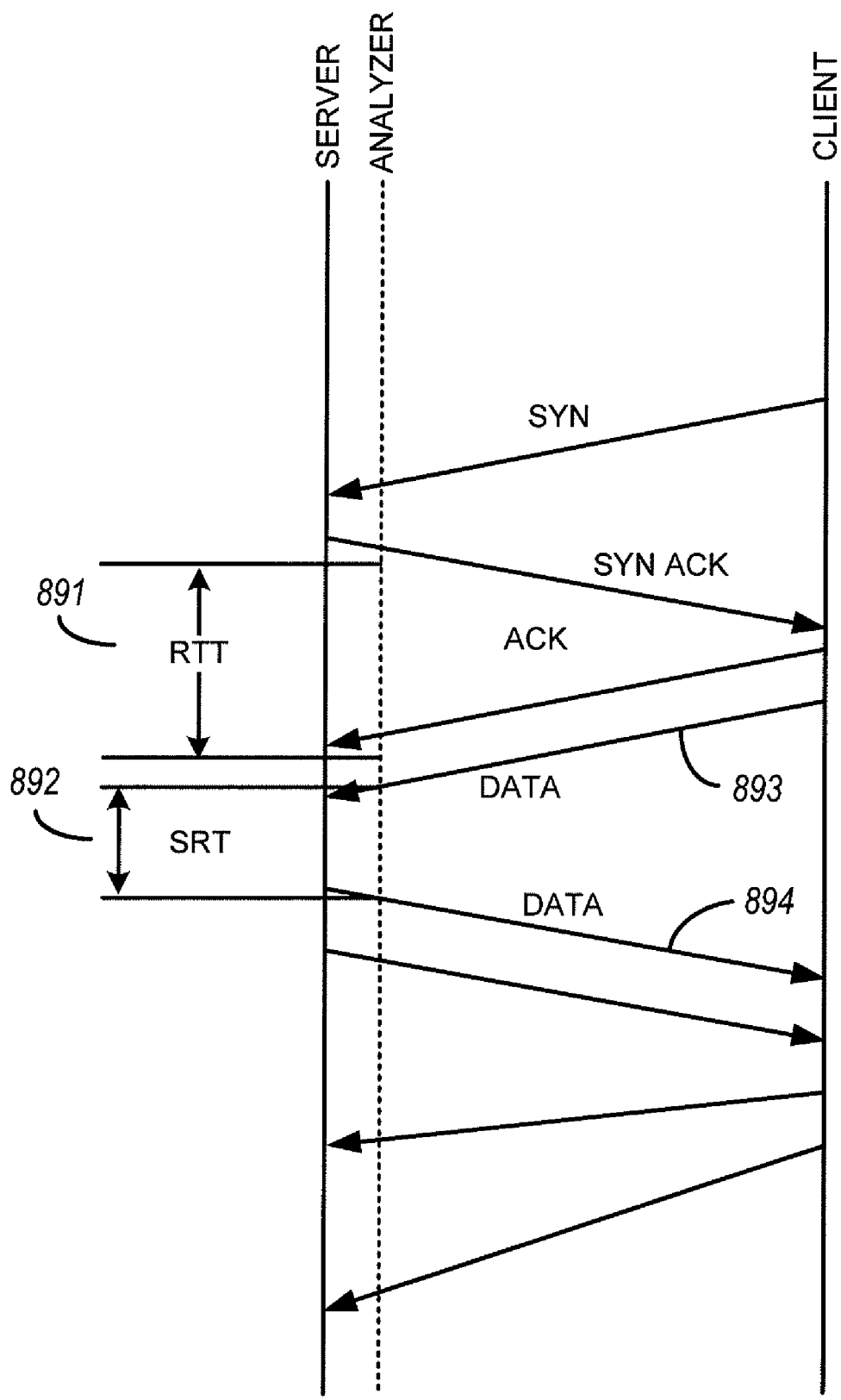
FIG. 8 is a simplified timing diagram of determining network performance metrics with an exemplary flow control system located near a server or a destination.

FIG. 7 shows how correlator 652 of passive flow analyzer 630 of FIG. 6, placed near a source (e.g., client having a source address), can determine the network latency ("NL") and server response time ("SRT") for a TCP traffic stream. FIG. 8 shows how correlator 652 of passive flow analyzer 630 of FIG. 6, placed near a destination (e.g., server having a destination address), can determine the network latency ("NL") and server response time ("SRT") for a TCP traffic stream Correlator 652 of FIG. 6 determines NL, for example, by estimating the difference 791 of FIG. 7 in time between a TCP SYN packet and its corresponding TCP SYN ACK packet. The difference in time between SYN and SYN ACK 791 is a rough estimation of the RTT excluding the small amount of time 790 that the server takes to respond to SYN. The SYN ACK packet is handled in the kernel of most operating systems and is generally assumed to be near zero. For each new TCP stream that is initiated from the source, correlator 652 can observe a time instantaneous value for network latency.

Packet loss is calculated, as a percentage, by correlator 652 by maintaining the state of all of the retransmitted packets that occur. From this value, correlator 652 calculates percentage packet loss from a total count of segments sent.

Correlator 652 also determines SRT 792 of FIG. 7, for example, by estimating the delta time (i.e., difference) 793 between, for example, the HTTP GET message 795 and the first data segment received and then by subtracting the previous value for the RTT. This assumes that the previous value for the RTT has not changed beyond an operable range since the TCP handshake occurred. The measurement shown by 794 indicates that measured congestion increases in the path as SRT 792 correspondingly increases. For purposes of this example, it is assumed that the data segments in the initial HTTP GET are sent back to back. In FIG. 7, the passive flow analyzer 630 is deployed close to (i.e., minimal or negligible latency due to geographically different locations) the clients requesting content from the IP data network, such as the Internet.

Correlator 652 also determines SRT 892 of FIG. 8, for example, by estimating the delta time between the HTTP GET, message 893 and the first data segment 894. In FIG. 8, the passive flow analyzer 630 of FIG. 6 is deployed on the server end as will occur for most content delivery installations.

Referring back to FIG. 8, SRT 892 determined by correlator 652 depends on its location along the path that the traffic traverses. If passive flow analyzer 630 of FIG. 6 is on the client side, server response time 792 of FIG. 7 can be estimated as the delta in time between the HTTP GET Request message and the first data segment returned minus the RTT observed before the GET Request as shown in FIG. 7. If passive flow analyzer 630 of FIG. 6 is closer to the server side, the estimation is essentially the delta in time between the GET Request and the response as shown in FIG. 8. Congestion estimations are also possible by using the TCP Congestion Window ("cwnd") and by identifying the delta in receive time between segments that were sent back to back by the server, where the TCP congestion window controls the number of packets a TCP flow may have in the network at any time. Correlator 652 is coupled to provide the above determined exemplary flow characteristics to aggregator 653.

Referring back to FIG. 6, aggregator 653 primarily operates to group all flows going to each set of specific destinations together into one grouping. Aggregator 653 uses the service level statistics for each of the individual flows, received from Correlator 652, to generate an aggregate of service level statistics for each grouping of flows that are to go to the same destinations in the data network, such as the Internet. Aggregator 653 is also coupled to traffic storage 621 to store such aggregated (i.e., grouped by address prefix) traffic flow characteristics. Traffic flow characteristics (or traffic profiles) are then used for future statistical manipulation and flow prediction. In a specific embodiment, storage 621 is the equivalent, or the same, as storage 221 of FIG. 2.

The granularity of the destinations is the same as the granularity of changes that can be made in the routing table. Nominally, flow control system of FIG. 2 could install routes with prefixes of any length (i.e., 0/ to /32), though the general practice is not to do so. Aggregator 653, therefore, will start aggregating flow statistics at the /32 level (i.e., class C networks) and continue all the way up to the /8 level (i.e., class A networks) into a data structure, such as a patricia or radix trie, or a parent-child data structure, or the like. In this way, it is possible to seek very quickly the necessary granularity of the routing change that needs to be made to ensure the service level is met.

Aggregation techniques employed by aggregator 653 are used to maintain the system 200 of FIG. 2 to acceptable performance service levels, such as determined by one or more flow policy requirements. Since network performance has been shown not to follow conventional statistical distribution, such as Gaussian or Poisson distribution, average calculations for service levels across all flows are not as reliable a measurement of a typical performance behavior during a pre-determined time interval. If the service level agreement (SLA) or policy, however, states that the average service level must be maintained, then the outlying occurrences of poor performance will cause the average to be skewed, thus requiring corrective action to restore the minimum service levels being offered. A meaningful way to describe typical service levels being offered across all flows is to use median values, rather than average values. A person having ordinary skill in the arts will appreciate that either technique is possible and will depend on the definition of the service level that must be maintained.

Figure 9:
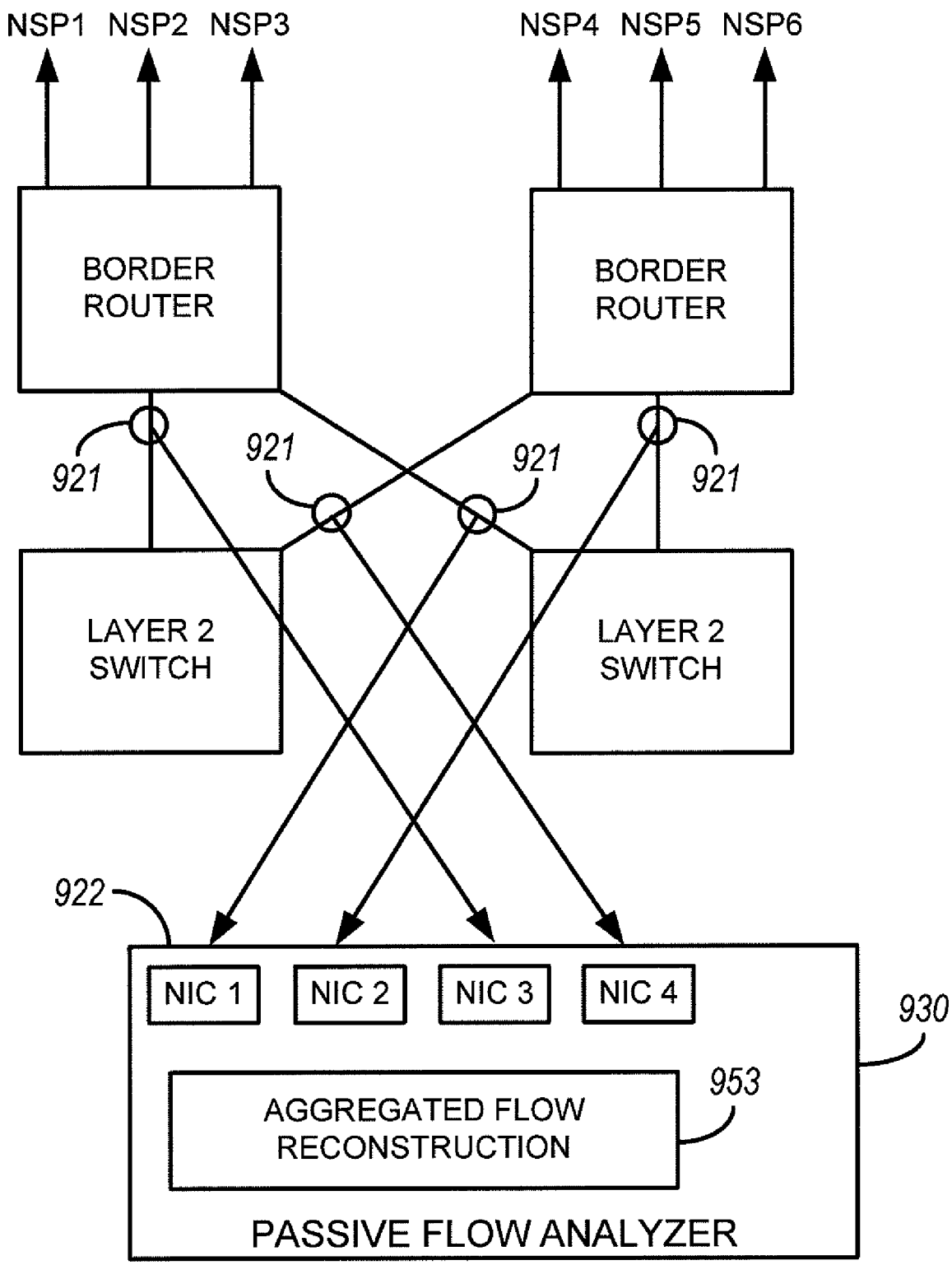
FIG. 9 is a network diagram of an exemplary passive calibrator with distributed packet capture according to another embodiment of the present invention.

FIG. 9 illustrates how passive flow analyzer 930, according to another embodiment of the present invention, is capable of packet capture and flow reconstruction across more than one network interface, each interface represented by a network interface card ("NIC"). In practice, many switch fabrics are constructed in a manner by tapping into a single point in the data stream or replicating a single port. The switch does not guarantee that passive flow analyzer 930 will see all of the traffic in both directions. Bi-directional traffic is required for optional flow reconstruction for passive analysis. In FIG. 9, the switch fabric shown must be passively tapped at tap points 921 at four places (as shown) and connected to passive flow analyzer 931 at four different network interface cards (NIC) 922. Passive taps at tap points 921 can be mirrored switch ports or optical/electrical passive taps. Passive flow analyzer 930 has a single or combined aggregated flow reconstruction element 953 that can collect captured data from multiple network interfaces in order to perform flow reconstruction.

Figure 10:
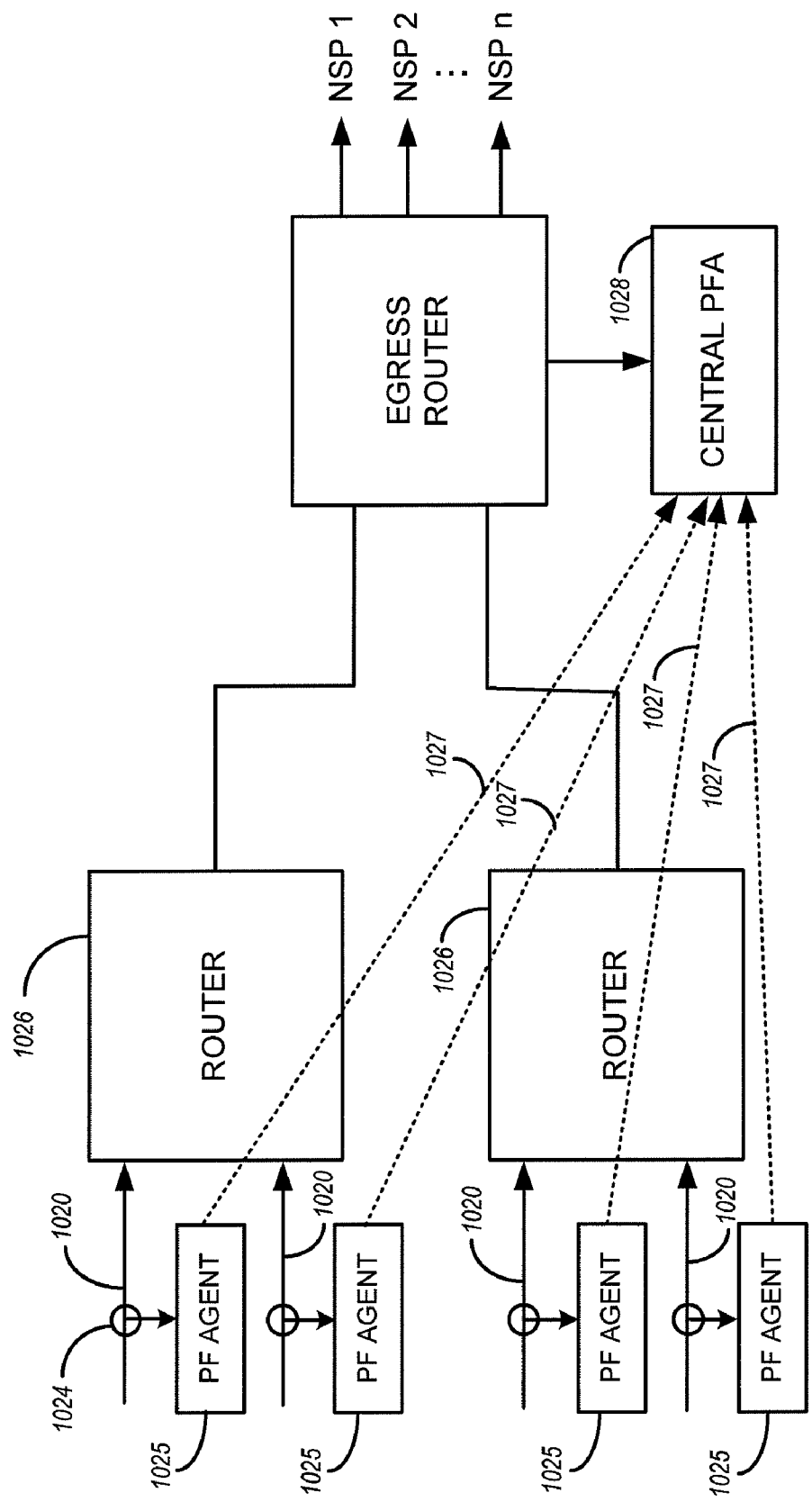
FIG. 10 is a network diagram of distributed passive flow elements according to yet another embodiment of the present invention.

FIG. 10 illustrates yet another embodiment of the present invention where passive flow analyzer 630 of FIG. 6 is distributed in nature. FIG. 10 shows traffic flow 1020 bi-directionally traveling via several local traffic source points. Distributed local passive flow agents 1025 are tapped passively at tap point 1024 into traffic flow 1020. Passive flow agents 1025 are distributed such that each agent monitors and conveys individual flow characteristics. The traffic sources are distributed across a layer 3 infrastructure, for example, and are separated by one or more routers 1026. This arrangement prevents the passive flow analyzer 930 of FIG. 9 from collecting information across the same layer 2 switch fabric as in FIG. 9. Each of the passive flow agents 1025 performs local flow reconstruction and then exports flow data records 1027 over the network to a central passive flow analyzer 1028, performs flow aggregation and service level analysis across all of the distributed passive flow agents 1025.

Figure 11:
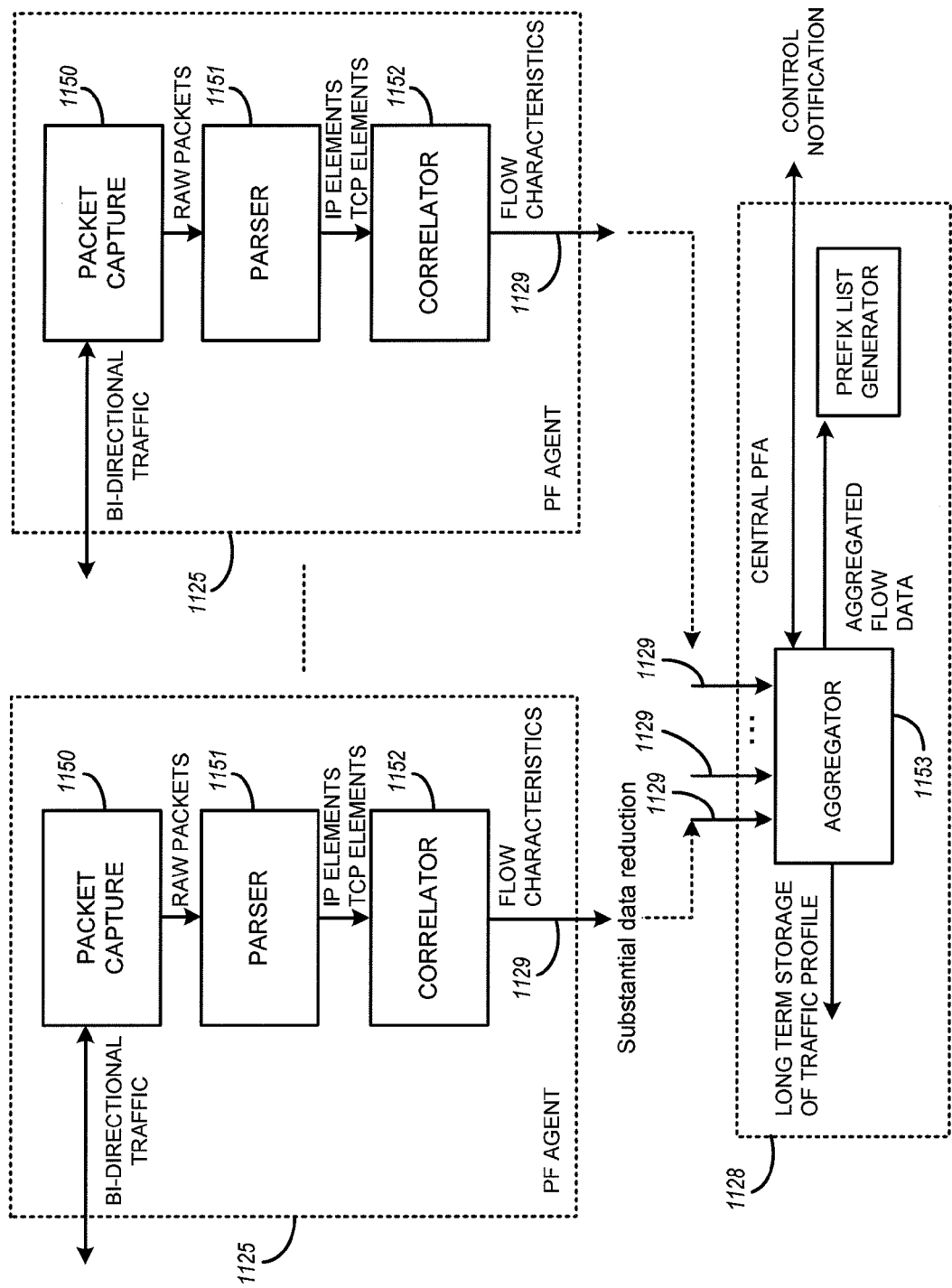
FIG. 11 is a functional block diagram of the distributed passive flow elements of FIG. 10 according to still yet another embodiment of the present invention.

FIG. 11 illustrates a more detailed functional block diagram depicting multiple passive flow agents 1125 separately distributed and a single central passive flow analyzer 1128. Each passive flow agent 1125 includes packet capture 1150, parser 1151 and correlator 1152 functions on each of the local traffic flows. Correlator 1152 exports flow records 1129 with substantial data reduction to central passive flow analyzer 1128. Substantial data reduction is used to reduce the amount of information forwarded to the central passive flow analyzer and can be effectuated by using well-known encoding techniques. Central passive flow analyzer 1128 accepts flow export records 1129 from each passive flow agent 1125 and central aggregator 1153 performs prefix aggregation on each of the exported flows. Thus, the centrally aggregated flow information can be used to determine if a particular policy violation is occurring.

Figure 12:
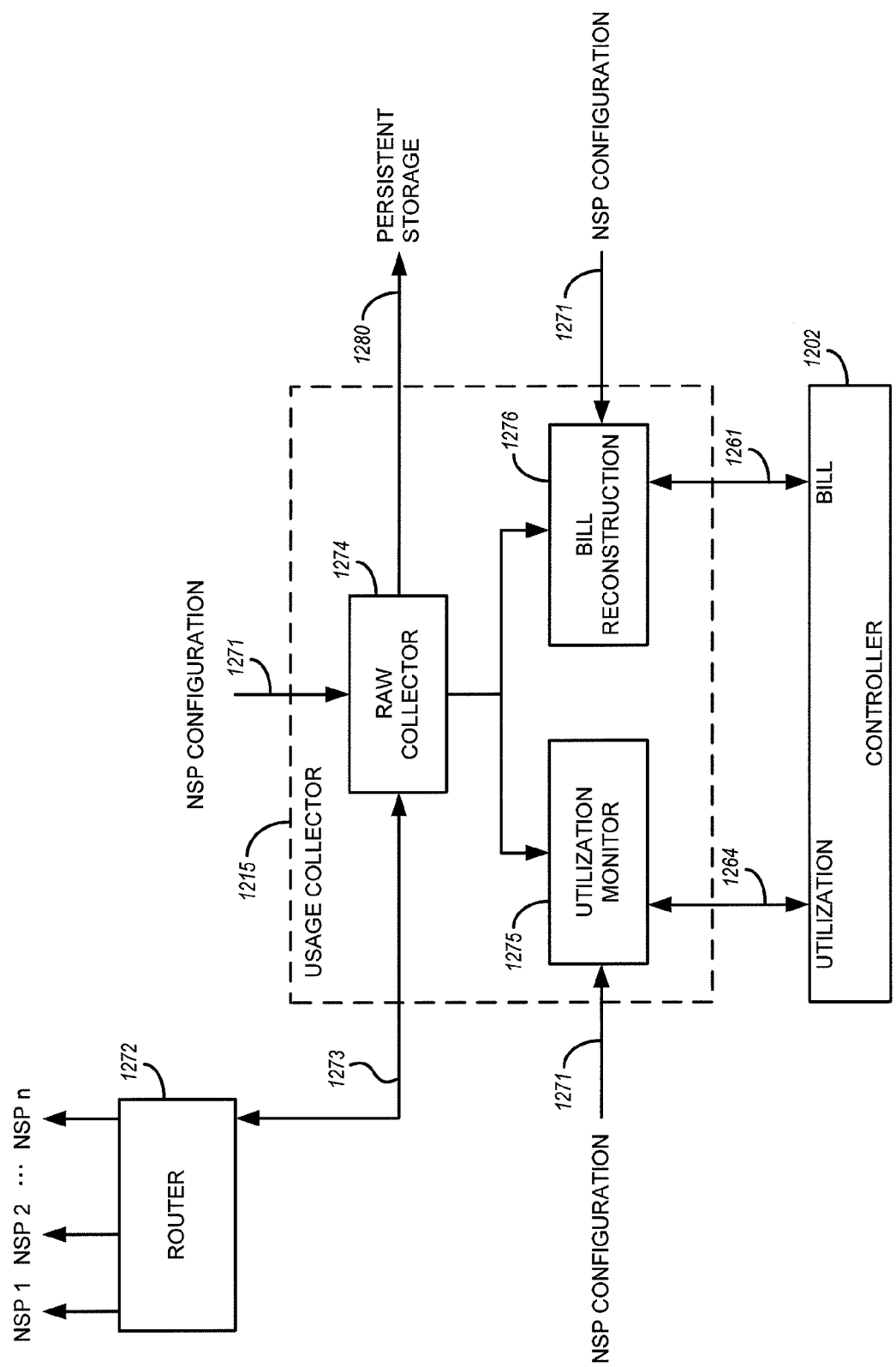
FIG. 12 is a detailed block diagram of an exemplary usage collector according to a specific embodiment of the present invention.

FIG. 12 illustrates a detailed block diagram of usage collector 214 of FIG. 2. Usage collector 1215 operates to collect usage information 1273 from network providers, such as byte counters (i.e., the amount of traffic transmitted to and received from network service providers). Usage collector 1215 uses this information to calculate network service provider utilization, load, etc., of data paths associated with the provider.

Usage collector 1215 also operates to reconstruct provider billing records. Usage collector 1215 accepts provider configuration information 1271 related to each network service provider (NSP) connection. This NSP configuration information 1271 details provider interfaces on the various routers 1272 (e.g., egress routers), provider next-hop IP addresses traceroute probes (to verify the current provider in use with trace probes), billing period start and end dates, circuit bandwidth for calculating the utilization and price per megabit/sec, minimum bandwidth commitment, burstable rates, provider sampling interval, provider billing algorithm, a utilization alarm threshold and the like.

In operation, exemplary raw collector 1274 sends a query 1290 (e.g., SNMP) to collect interface raw byte counters from routers 1272 on each of the provider circuits at a specified sampling interval. Provider circuits include paths, pipes (virtual or physical), T1, and the like. Raw Collector 1274 places the raw byte counters 1280 into persistent storage for later reporting and analysis. Raw collector 1274 sends the raw information to two other components: utilization monitor 1275 and bill reconstructor 1276.

Utilization monitor 1275 calculates the ingress and egress circuit utilization for each provider using the raw byte counts and the NSP configuration information 1271. In one example, NSP configuration information 1271 includes the bandwidth of the provider's circuits. Utilization information 264 includes data representing utilization trends for use with short range forecasting models (e.g., ARIMA, exponential smoothing, etc.) such that utilization monitor 1275 can determine whether bandwidth is trending up or down (i.e., increasing or decreasing in size) for a given service provider.

Figure 15:
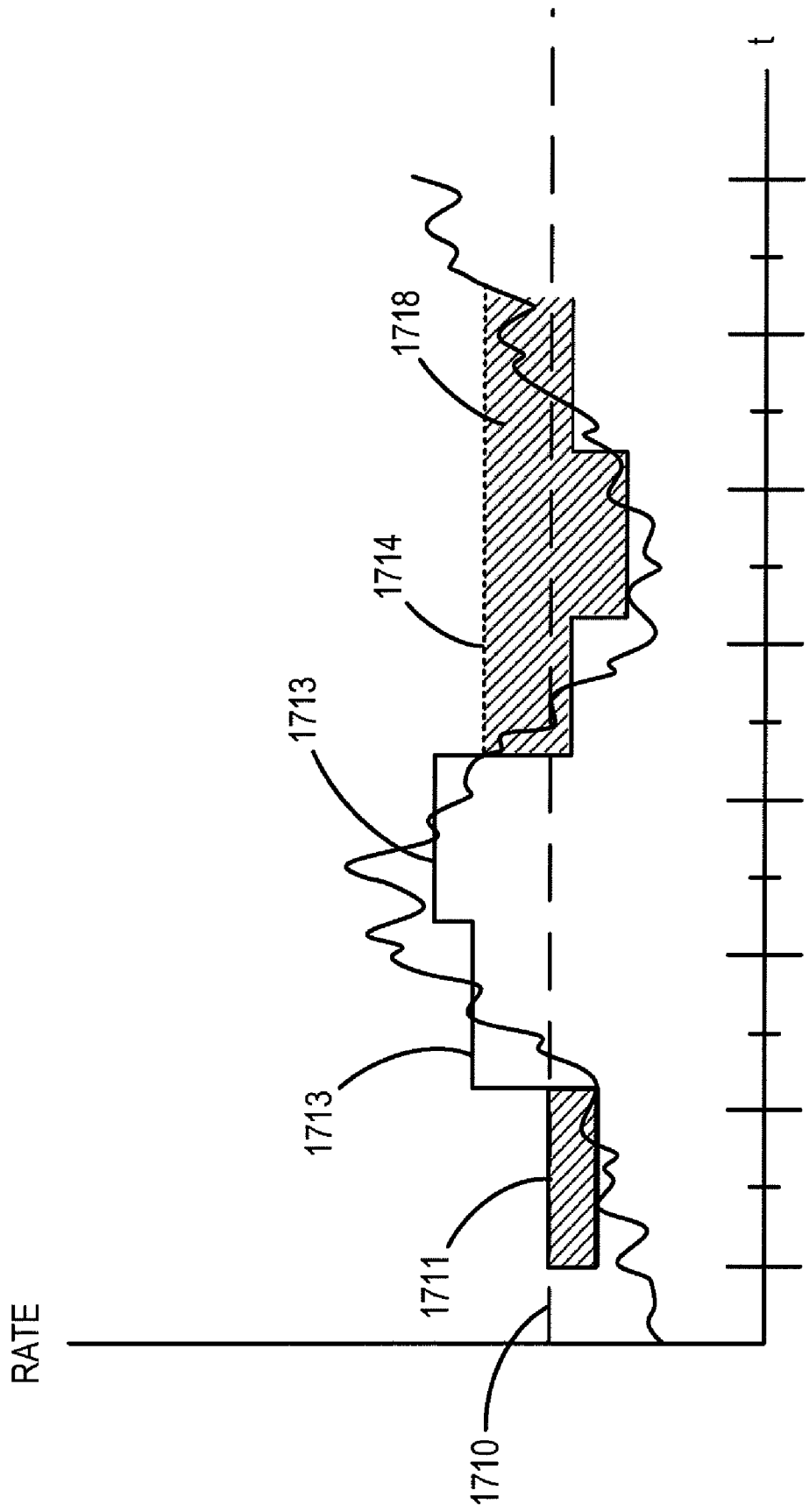
FIG. 15 is a graphical representation illustrating an exemplary method to calculate billable rates in accordance to the present invention.

Bill reconstructor 1276 uses the billing information from NSP configuration data 1271 to reconstruct the current provider billable rate for the current billing period. Billing information includes information explaining the methods that specific providers use to calculate costs, such as a billing rate. Such methods of calculating bills for using a network provider are well known in the art. Bill reconstructor 1276 applies similar provider billing methods to the raw byte counters from raw collector 1274 to generate the bill and related billing rates, etc. The generated bills, which are mapped into dollar amounts, are typically estimates since the sample times between the provider and usage collector 1215 will not match exactly. Bill reconstructor 1276 will send billing information 1261 to controller 1202 for use in peak avoidance and least cost routing. Peak avoidance is defined as a method of avoiding using a path or path segment at a higher billing rate, such as shown in FIG. 15. Least cost routing refers to a method of using or defaulting traffic to the least expensive provider.

Additionally the information can be sent to controller 1202 for use in the least cost fix method of selecting the cheapest if performance is of no consequence. That is, controller 1202 uses data from billing message 1261, including billing rates, to determine an alternate route based in part on a route's free bandwidth (i.e., route does not incur additional cost to use), in accordance with the flow policy.

Referring back to FIG. 2, configuration element 211 is coupled to controller 205 and to data director 220. Controller 205 provides the best route to reach a destination prefix to configuration element 211. Configuration element 211 operates to change the default routing behavior (i.e., current path) for the destination requiring corrective action. Configuration element 211 changes the routing behavior by, for example, sending a modified routing table of addresses to data director 220.

Once data director 220 receives this information, direct 220 informs controller 205 that route change has been implemented. Thereafter, controller 205 communicates signal 230 back to passive calibrator 202 to clear its state and to resume monitoring the destination. The destination is monitored to ensure that the updated route of the routing table, or path, meets minimum service levels (e.g., no violations of SLA, or no unacceptable deviations from agreed upon performance metrics as defined by the associated flow policy).

In one aspect, configuration element 211 resides in a route server. In another aspect, configuration element 211 resides in a router and is configured to modify a route map or table. In yet another aspect, configuration element 211 is adapted to provide configuration information, or routing table. In still yet another aspect, the route information is stored within the configuration element 211 according to whether it is related to inbound or outbound traffic.

Figure 13:
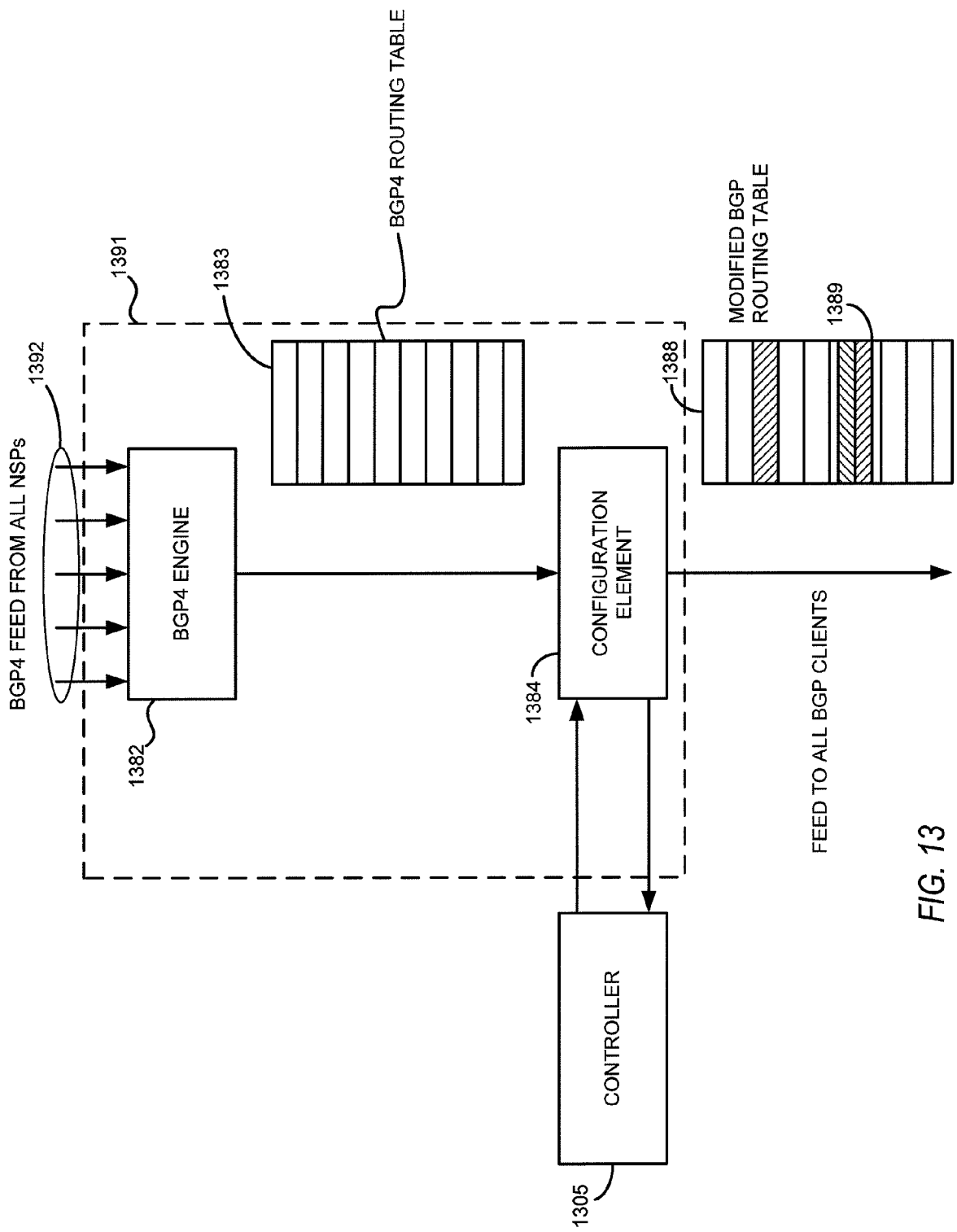
FIG. 13 is a block diagram of a route server using an associated configuration element receiving either multiple BGP4 feeds or at least one iBGP feed according to one embodiment of the present invention.

FIG. 13 shows an example of yet another embodiment of the present invention, where configuration element 211 of FIG. 2 resides in a network element, such as route server 1391. Configuration element 1384 of FIG. 13 operates similarly to other adaptations of configuration elements described herein. That is, configuration element 1384 modulates the current or default routes of data traffic and thus modifies the default routing behavior, for example, in a local deployment (e.g., Point of Presence, or "POP"). Route server 1391 ("RS") receives a full set or subset of routing tables from the data networks of interest.

In one embodiment, the routing tables are received into route server 1391 by way of one or more default BGP4 feeds 1392 into BGP4 Engine 1382 from a full set or subset of the local transit providers. BGP4 Engine 1382 integrates, or merges, all of the routes into a single BGP4 routing table 1383 best available routes. In another embodiment, route server 1391 maintains an iBGP session with all of the internal BGP capable routers rather than maintaining the BGP4 sessions as shown in FIG. 13. With a single iBGP session there is no need to configure all of the BGP sessions with the network service providers before making route changes.

Configuration element 1384 is designed to receive one or more BGP4 routing tables 1383 from BGP4 engine 1382 and is adapted to receive one or more control signals and data resulting from the control processes of controller 1305. In operations, configuration element 1384 receives, from controller 1305, the necessary routing changes to be implemented in default routing table 1388. Then, configuration element 1384 incorporates one or more changes in modified routing table 1389.

Thus, configuration element 1384 operates to modify BGP4 routing table 1383 and to generate one or more modified BGP4 routing tables 1388. Modified BGP4 routing table 1388 includes changed routing 1389, advertisements of more specific routes, etc. New modified BGP4 routing table 1388 is then fed to all BGP clients in the network, which then is used to guide traffic to the destination.

For a given source address, the ingress point into a network is determined typically by the advertisements of routes made to downstream providers and a provider policy (set of rules that is set up by such providers). Eventually, the network service provider (e.g., "ISP") that is hosting the destination will receive such advertisements.

Controller 205 of FIG. 2 is designed to receive performance characteristics, such as latency, loss, jitter, etc., as monitored by the calibrator elements as well as usage characteristics, such as bandwidth, costs, etc., as monitored by the usage collector. Controller 205 is coupled to policy repository 218 to receive flow policies, which typically include service level agreement ("SLA") performance metrics. These metrics, or requirements, are compared against the monitored performance and usage characteristics. If a particular policy is violated (i.e., one or more performance metrics are outside one or more expected ranges or values), controller 205 determines a subset of one or more alternate data paths that conform to the associated flow policy. In another example, controller 205 selects a best or optimized path as an alternate data path that best meets the performance requirements and usage requirements, as defined by the policy.

The active calibrator and the passive calibrator provide performance characteristics. Regarding the active calibrator, controller 205 initiates active calibration by request active probing. The active calibrator sends one or more calibration probes on probe path 207 out into the one or more data networks. The returning probes on probe path 207 provide information back to controller 205, which contains the identities of available paths and performance information related thereto.

Regarding the passive calibrator, controller 205 is designed to receive real- or near-real time network performance characteristics (i.e., loss, latency, jitter, etc.) from passive calibrator 230 as monitor in traffic flows in which it has access. After, controller 205 provides a routing change, or update, to configuration element 211, it also communicates a signal 230 to passive calibrator 203 when an updated route change is made to a specific destination. Signal 230 initiates the clearing of the state of passive calibrator 203 so that the calibrator resumes monitoring the specific destination to ensure that the updated route of the routing table, or path, is flow policy compliant. Clear state signal 338 of FIG. 3 depicts the signal that comes from the controller to initiate the resetting of the passive flow analyzer's state.

In one example, controller 205 operates to interpret the aggregated flow data over an interval of time for each of the groupings of destination prefixes. And if a policy violation occurs, controller 205 determines which of the alternate routes, or paths, are best suited for the prefix or traffic type associated with the current traffic flow. Controller 205 then sends the necessary routing changes to configuration element 211. That is, controller 205 resolve policy violations relating to non-compliant network performance characteristics, in accordance with the associated flow policy. This process is repeated until the policy violation is resolved.

In another example, controller 1202 of FIG. 12 is designed to receive real- or near-real time data representing network usage characteristics from usage collector 1215, such as usage rate, billing rates, etc. Controller 1202 uses this information to resolve policy violations relating to non-compliant usages characteristics, in accordance with the associated flow policy. That is, prior to or during a route change, controller 1202 not only does the controller consider the performance of alternate paths, but also whether those alternate paths either avoid peak data traffic over a specific provider's path (i.e., adequate bandwidth related to turn-of-day) or are the least cost paths in view of the flow policies.

To resolve usage-type policy violations, controller 1202 is configured to receive routing tables, for example, to determine which of the current traffic flows or routing of data on certain paths, or path segments thereof, are congested (i.e., loaded) with respect to a particular provider path or paths. Controller 1202 also is designed to receive data representing flow volumes for each of the alternate provider paths to determine which subset of flows of a set of traffic flows to or from a given destination prefix are in compliance with the associated flow policy in terms of traffic flow volume.

An exemplary controller of the present thus is designed to obtain information related to the performance and usage of data networks and the make corrective action to effectively and efficiently route data over paths or segment of paths that meet at least associated policy requirements.

The following discussion relates to flow policies and the application of such policies in resolving policy violations and in enforcing the policy requirements or metrics. Referring back to FIG. 2, controller 205 is coupled to policy repository 218 for receiving one or more policies. As described above, a policy is a set of rules or threshold values (i.e., maximums, minimums, and ranges of acceptable operations) that controller 205 uses these rules to compare against the actual flow characteristics of a specific traffic flow. For example, a policy is the user-defined mechanism that is employed by controller 205 to detect specific traffic flows that are to be monitored and acted upon if necessary. As an example, a policy can also specify how the particular policy should be enforced (i.e., in includes a hierarchical structure to resolve violations from highest to lowest precedence). Although an exemplary policy includes requirements, or rules, related to detection, performance, cost, and precedence, one having ordinary skill the art should appreciate that less, or additional parameters, can be measured and enforced according the present invention.

Detection is defined as the techniques or mechanisms by which flow control system 200 determines which traffic that should be acted upon in response to a policy violation. The traffic flow can be identified, by name, by source or destination addresses, by source or destination ports, or any other known identification techniques. For example, a policy can be identified by address prefix. That is, system 200 will monitor the traffic flow to and from a specific prefix, and if necessary, will enforce the associated flow policy in accordance to its requirements. Further regarding detection, a policy defined for more specific prefixes can take precedence over more general prefixes. For example, a policy defined for a /24 will take precedence over a /16 even if the /16 contains the specific /24.

Performance is a policy requirement that describes one or more target performance levels (i.e., network/QoS policy parameters) or thresholds applied to a given prefix or prefix list. Although more than one performance-based policy requirement may be defined, in this example only a single policy is applied to a given prefix or prefix list. Exemplary performance requirements include loss, latency, and jitter.

Moreover, such requirements can be configured either as, for example, an absolute, fixed value or as an Exponentially Weighted Moving Average ("EWMA"). Absolute value establishes a numerical threshold, such as expressed as a percentage or in time units over a configurable time window. The EWMA method establishes a moving threshold based on historic sampling that places an exponential weighting on the most recent samples, thereby asserting a threshold that can take into account current network conditions as they relate to historic conditions.

Cost is expressed in the policy definition in terms of precedence and whether the policy is predictive or reactive. Costs are characterized by usage collector 214 of FIG. 2 through bill reconstruction and reconciliation of bandwidth utilization in both aggregate and very granular levels (e.g., by /24 destination network). Cost predictive requirements are used to proactively divert traffic from one provider to another in order to avoid establishing a peak (i.e., "peak avoidance") that may trigger a new or higher billable rate. Cost reactive requirements are used to reactively divert traffic from one provider to another when a minimum commit rate or current billable rate is exceeded.

Typically, both cost predictive and reactive requirements result in a binary decision (i.e., a circuit or path, for example, is either in compliance with or in violation of a flow policy). In the case of predictive cost, the transit circuit is either in compliance, or soon to be violation of a flow policy. Regardless, an action must be taken to resolve the situation, unless cost is preceded by performance (i.e., performance requirements are to be addressed prior to making a cost-based change).

Precedence is a policy requirement that describes one or more target usage or utilization characteristics or levels. Precedence includes provider preference and maximum utilization (i.e., load) requirements. The provider preference requirement is, for example, an arbitrary ranking of providers that is used when an action must be taken, but when two or more transits may be selected in order to enforce the policy. The flow control system can automatically set the provider or path preference requirement if it is not configured explicitly by the system's operator. This requirement is then applied as a tiebreaker in deadlocked situations such that the provider with the highest preference wins the tie and thus receive the diverted traffic flow.

The maximum usage requirement can be used as either may also be used an actual operational threshold not to be exceeded or as a tiebreaker. Maximum usage is configured, for example, in the transit provider section of the configuration and takes either a percentage argument (i.e., in terms of available bandwidth), or alternatively, can be set as an absolute value in terms of Mb/s (i.e., not to exceed available bandwidth).

The following is an example of a policy used with a controller to determine whether the specific policy is in compliance, and if not, to determine the course of action.

For example, consider the following policy is used for a particular traffic flow:

| Policy Requirement | Precedence | Value or Threshold |
|---|---|---|
| Loss | 10 | 2% |
| Latency | 20 | EWMA |
| Cost | 30 | Predictive |
| Maximum usage | 40 | |
| Provider Preference | 50 | |

Suppose that traffic flow is associated with prefix 24.0.34.0/24, is currently carrying traffic at 240 kbits/sec, and is reached via provider 1 of 3. Provider 1 is currently carrying 2 Mbits/sec and has a minimum commit of 5 Mbits/sec.

The controller of the flow control system using the policy can monitor the alternate traffic routes, or paths, and can determine the following flow characteristics as they relate to the providers:

| Requirement | Value for ISP1 | Value for ISP2 | Value for ISP3 |
|---|---|---|---|
| Loss | 5% (violation) | Not available | Not available |
| Latency | 140 ms | Not available | Not available |
| Cost | In compliance | In violation | In violation |
| Max Usage/ | 5 Mb/s | 5 Mb/s | 5 Mb/s |
| as Measured | 2 Mb/s (compliance) | 4 Mb/s (compliance) | 5.5 Mb/s (violation) |
| Latency | 100 ms | 100 ms | 100 ms |

In this case, ISP1 is in a violation state since loss of 5% exceeds the maximum loss requirement of 2% and since loss has been designated with the precedence of 10, with 50 being the lowest. Corrective action must be taken. The policy will be enforced without latency or loss information (i.e., because there is, for example, no visibility into the performance of the other links). In this case, the controller may initiate active probing using the active calibrator to determine whether the other ISPs (including ISP2 and ISP3) are in compliance. Alternatively, the controller might determine the course of action based on the next parameter in the policy where the requirement is known (e.g., cost in this case). Since ISP 2 is in compliance and ISP 3 is not, ISP 2 would be chosen by the controller. If the two were both in compliance, the controller would go to the next ranked requirement, which is MaxUtil. If this is the case, ISP2 would is still selected.

In summary, the policy, such as the above exemplary policy, is input into the controller 205 of FIG. 2 and is associated with, for example, a specific prefix. The general detection method (absolute or baseline/historical) can be specified as per prefix, thus specifying hard or absolute thresholds for some destinations that are well known, while using a baseline method for other destinations. The policy also defines the resolution method (e.g. procedure) to be used in the combination with performance metrics that must be met before the violation is considered resolved. Other parameters such as cost and utilization thresholds can be set per prefix. This gives the controller an indication of which prefixes should never be moved for cost or utilization reasons and which prefixes should be moved under any circumstances.

In order for controller 205 to handle peering connections, controller 205 communicates with the data director 220 to retrieve reachability information (i.e., routing tables) for the specific prefix that is about to be changed. In the case of transit circuits, controller 205 uses active calibrator 207 to determine reachability information (i.e., routing tables) for a given destination by, for example, sending active probes to the destination and then waiting for the response. Although peering connections are often unreachable, it is possible for active probes to succeed since some providers may not effectively filter traffic at a peering point and instead rely on an honor-like system to ensure that only traffic to those advertised destinations is received.

Therefore, in the case of peering, controller 205 must look in the routing table for an advertisement of that destination before moving traffic to a peering connection. Referring to FIG. 15, iBGP feed 1599 includes advertised inactive routes as well as active routes. Otherwise, data director 220 of FIG. 2 can be configured in accordance to route server 1591 of FIG. 13, where eBGP is available from all providers.

Figure 14:
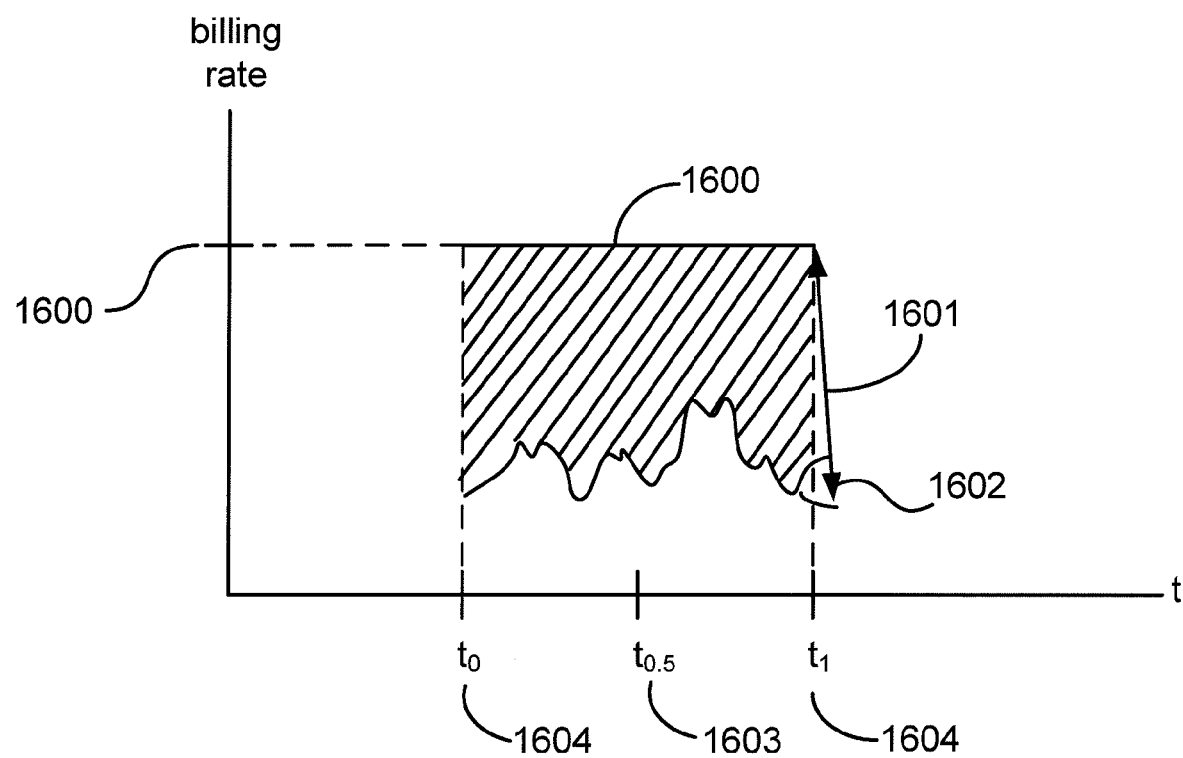
FIG. 14 is a graphical representation illustrating an exemplary method to determine the amount of bandwidth available that can be used without additional cost in accordance to the present invention.

FIG. 14 illustrates how the availability of "free" bandwidth is expressed for a given provider and as measured by usage collector 214 of FIG. 2. Over any given time period from t0 though t1, current usage rate 1602 and the current billable rate 1600 is determined. As shown, time point t0.5 1603 represents an over-sampled time point. Difference 1601 between these two values represents an amount of bandwidth available to be used without incurring any additional cost. The free bandwidth per provider can be used to select a subset of compliant providers when a performance-based policy is in violation by the current or default provider. Additionally, this information is used to apply cost- and load-based policies for each provider.

FIG. 15 depicts how usage collector 214 calculates the time-continuous billable rate as shown in FIG. 14. Most providers start out with a minimum commitment level 1710. If the current usage starts out below that commitment, the free bandwidth 1711 is shown. Samples are collected at twice the provider sampling rate to ensure that an accurate rate is being calculated (i.e., this is a conservative estimate and if the rate deviates from the provider rate, it will be higher and represent an overestimation of the billable rate). The small tick marks on the time axis represent the samples collected by the system (i.e., over-sampling). When enough samples are collected, the billable rate, which generally is expressed as the $95^{th}$ percentile of all rate samples, may exceed the minimum commitment as shown by successively higher tiers 1713 of the billable rate in FIG. 15. When the traffic drops back down below this rate, a new billable rate 1714 is set and the system again has free bandwidth 1718 available for use.

Figure 16:
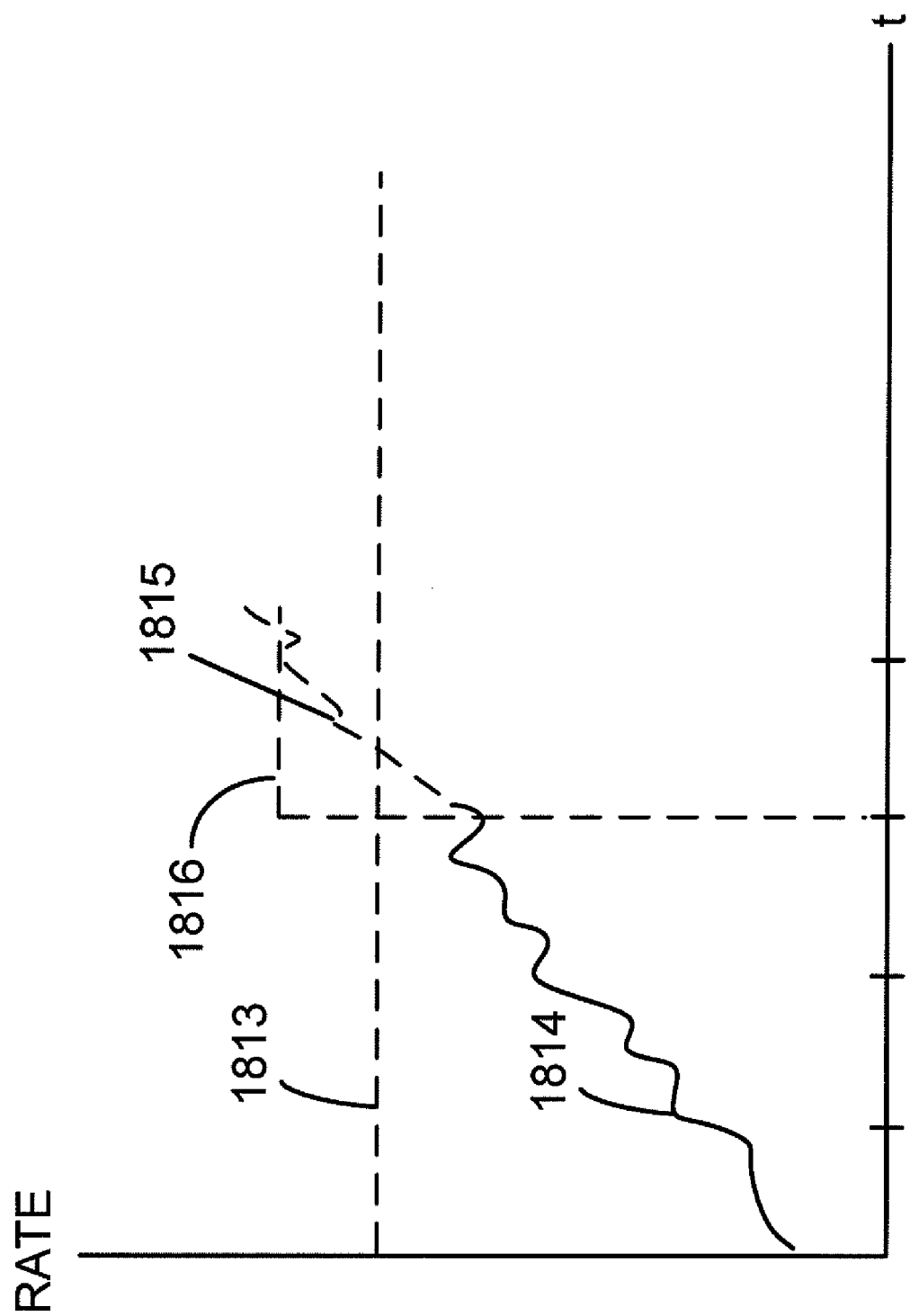
FIG. 16 is a graphical representation depicting an exemplary method to calculate billable rates using short range forecasting in accordance to the present invention.

FIG. 16 shows how an exemplary system 200 will detect a cost-based policy violation. Suppose the cost policy requirement is defined to be an absolute threshold, as shown by 1813. This threshold can be an absolute rate or a set dollar amount to spend (which is converted by the system to an average billable rate). On a sample-by-sample basis, the actual traffic rate 1814 should be such that a new billable rate above 1813 is never established. Using short range forecasting techniques, the traffic rate for the next few samples 1815 can be forecasted, and if this forecast predicts that a new billable rate 1816 will be established, controller 205 of FIG. 2 can react by moving traffic off of this provider.

In accordance with yet another embodiment, active calibration is not relied upon to control routing of data over data networks. For example, active calibrator 208 of FIG. 2 is absent from flow control system 200. This embodiment, and variants thereof, are suitable for route control applications where it is preferable not use active probes (i.e., "probeless" applications) in determining optimum and/or policy-compliant paths between two points between which data flows. Commensurate with this embodiment, candidate paths on which a data flow travels between a first point and a second point is monitored, characterized (i.e., in terms of data flow characteristics), and collected in a passive manner without affecting other network traffic. The injection of active probes into the one or more data networks in which information regarding possible candidate paths are sought, in contrast, can affect network traffic and other aspects of route control management.

Figure 18:
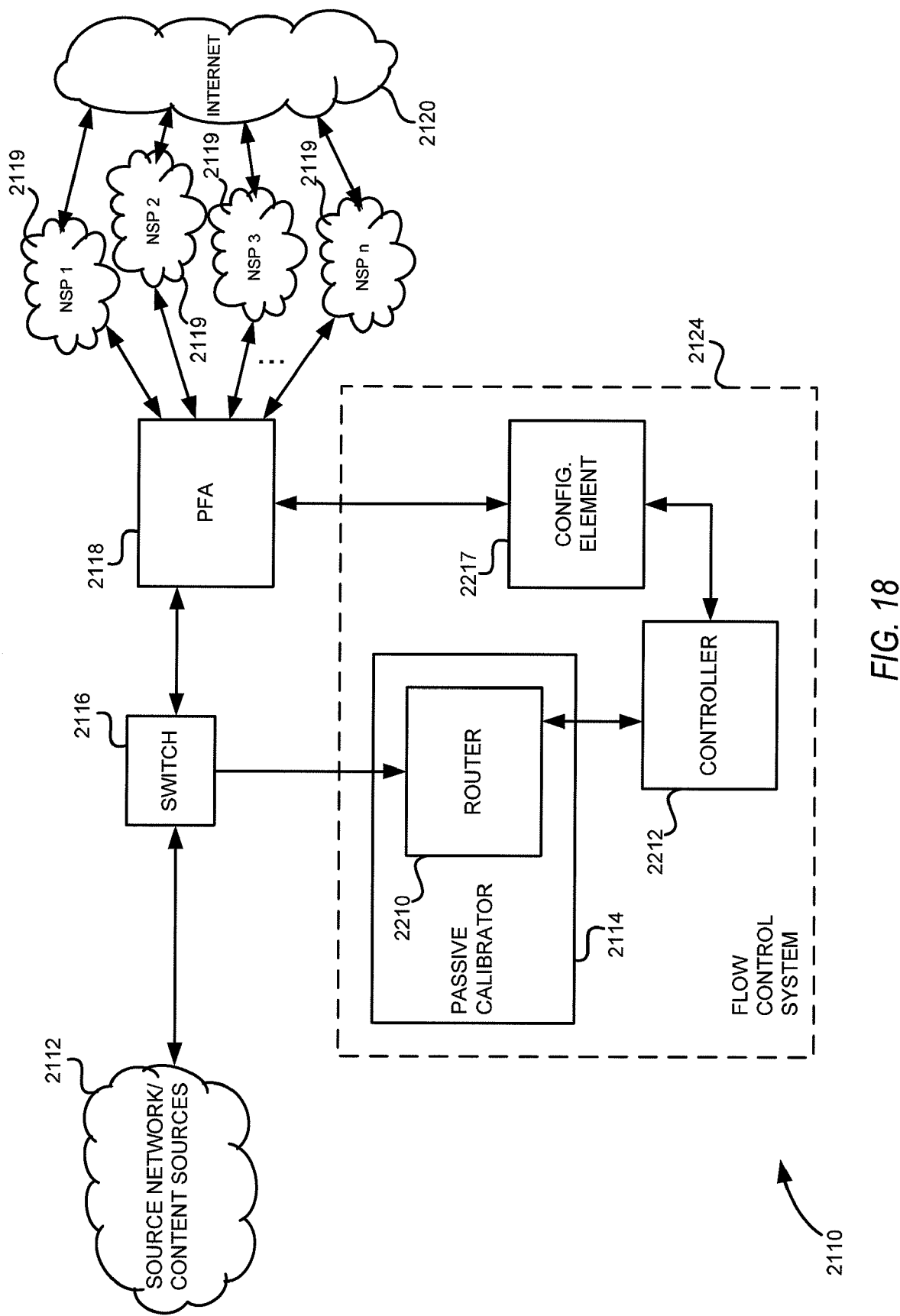
FIG. 18 illustrates a simplified data network and route control system for implementing passive route control in accordance with an embodiment of the present invention.

FIG. 18 is a simplified functional block diagram illustrating an exemplary flow control system 2124 for providing probeless route control in accordance with a specific embodiment. System 2110 includes source network/content sources 2112, switch 2116, router 2118, NSPs 2119, and Internet 2120. The elements source network/content sources 2112, switch 2116, router 2118, and NSPs 2119 are similar in functionality and/or structure to network/content sources 94, switch 96, router 98 and NSPs 92, respectively, each of which interacts with other specific elements in a similar fashion as those described in connection with FIG. 2.

System 2110 also includes flow control system 2124, which in turn comprises at least passive flow analyzer ("PFA") 2210 of passive calibrator 2114 and controller 2212, each of which can be realized in hardware, software, or a combination thereof. For example, controller 2212, passive calibrator 2114, and configuration element 2117 are software modules designed to perform specific processes necessary to provide probeless route control. Such modules can reside in a single computing device or can be distributed across two or more computing devices. For example, configuration element 2217 can reside on router 2118 or any other element of system 2110. In this example, configuration element 2117 is similar in function as configuration element 211 of FIG. 2.

Passive flow analysis to determine, possible candidate paths can be performed by exemplary PFA 2210, which can function similarly to passive flow analyzer 630 of FIG. 6. Alternatively, passive flow analysis can be performed by passive flow agents 1025 of FIG. 10, passive flow agents 1125, or any other equivalent passive flow analyzation process or module within the scope and spirit of the present invention. Lastly, it should be noted that router 2118 can be similar in function and/or structure as to data director 220 of FIG. 2.

Exemplary controller 2212 functions to determine whether a particular data flow is meeting defined performance levels, for example, as set forth in a policy. Alternatively, controller 2212 also operates to determine whether an optimal path is available on which traffic can be transported. That is, the optimal path can be the path that best meets the objectives of a specific flow requirement. For example, in the event that multiple candidate paths meet a certain performance requirement, such as packet loss, the candidate path that best improves performance of the data flow will be selected. If the requirement relates to packet loss, then the candidate path with the lowest amount of packet loss will be selected regardless of whether the policy requirement is met.

In operation, PFA 2210 monitors one or more data flows over a default (i.e., current) path to obtain one or more data flow characteristics with which to determine whether a destination, for example, is experiencing end to end network performance that is substandard or in non-compliance with at least one requirement of the policy. Upon detecting a non-compliant characteristic, controller 2212 begins assessing alternate (i.e., candidate) paths that can better meet the requirements of the policy. Rather than employing active probes to assess potential candidate paths and the performance thereof, controller 2212 uses PFA 2210 to assess and select one or more candidate paths through which the default data flows. Accordingly, a candidate path is selected in order to improve the current performance in terms of measured data flow characteristics, such as round trip time (RTT), packet loss or other like performance or usage characteristics.

Controller 2212 is configured to receive monitored flow characteristics as well as flow policies from a policy repository, such as policy repository 218 of FIG. 2. Controller 2212 is further configured to determine if a flow policy is violated, and upon detection of such a violation, to then select a remedial action to resolve the violation. Configuration element 2217 is coupled to controller 2212 to receive information to initiate possible remedial actions and is configured to communicate such actions to router 2118. Thereafter, router 2118 implements the corrective action to change the data flow from the current path to, for example, a next path.

After a period of time has elapsed, controller 2212 reevaluates the performance of the next path. If the next path fails to meet the associated performance requirement, or alternatively, if controller 2212 continues to search for an optimum path in relation to the associated performance characteristic, controller 2212 will instruct configuration element 2217 to switch the data flow to yet another path. Controller 2212 then reevaluates the performance characteristics to determine whether the flow characteristics of the data flow on the latest path is improved over, or at least equal to the performance of the previous paths. The aforementioned process of using passive flow analyzation of a data flow over one or more candidate paths, over time, is described herein as "time-division multiplexing" of a data flow over a set of paths.

Figure 19:
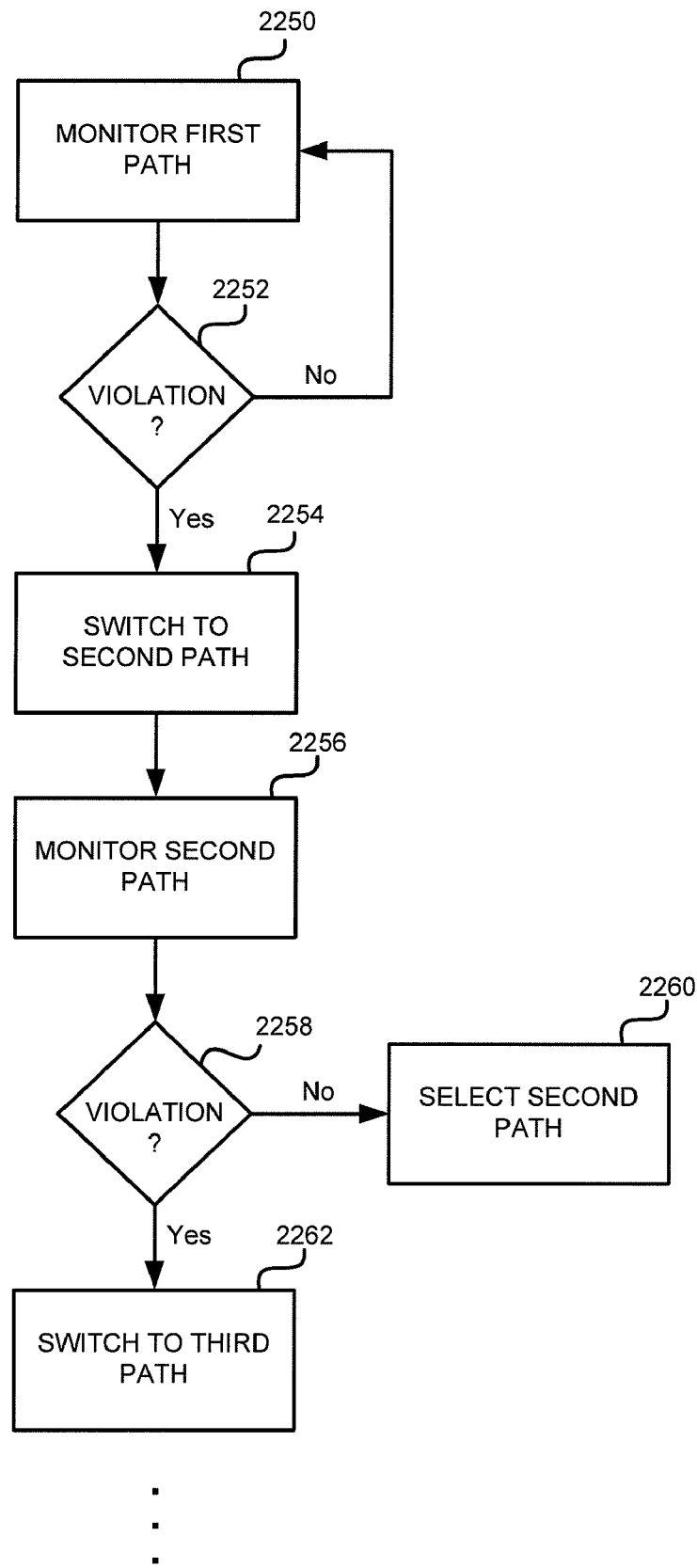
FIG. 19 illustrates FIG. 18 in further detail.

FIG. 19 is a flowchart illustrating an exemplary process of time division multiplexing in the implementation of route control, in accordance with a specific embodiment. At 2250, flow control system 2210 monitors the flow characteristics (e.g., in terms of performance and/or usage) of a data flow between a first point and a second point on a default path. The data flow can be monitored by PFA 2210 to at least capture and parse packets of the data flow, as described in connection with FIG. 6, as part of the passive monitoring process.

At 2252, PFA 2210 or controller 2212 either individually or in combination detects that a flow characteristic is violating at least one policy requirement. In alternate embodiments, the determination of whether a violation exists at 2252 is absent from a time division multiplexed route control. In such embodiments, an exemplary flow controller periodically performs time division multiplexed monitoring of a data flow to determine whether another candidate path is available to provide improved flow characteristics, regardless of whether the default path is in conformance with each of the associated policy requirements. Another candidate path is deemed "available" if it has at least one or more flow characteristics of interest that are improved over the data flow on the default path.

At 2254, an exemplary controller, such as controller 2212, initiates a path change in cooperation with configuration element 2217 of FIG. 18. In turn, the configuration element provides the path change to router 2118 to switch the data flow from the default path to a second candidate path. The duration of time over which the second candidate path is evaluated at 2256 can be any amount of time necessary to sufficiently describe the flow characteristics of the data path.

At 2258, exemplary flow control system 2124 can operate to compare the second candidate path's monitored flow characteristics against a policy. A violation of the policy exists, therefore, as a result of determining that the second candidate path has at least one data flow characteristic that is not in conformance with a policy requirement. However, if the second candidate path meets all policy requirements of interest, the second candidate path remains as the new default path at 2260.

At 2262, time-division multiplexed monitoring continues in a similar fashion as described above in at least two cases. A third candidate path is monitored and evaluated if the policy is not yet met by the second candidate path. Alternatively, a third candidate path can also be assessed if the flow control system determines that it is beneficial to seek improved performance over both the default path, the second candidate path, or any other previously monitored path. In other embodiments, more than three candidate paths (as indicated by the dotted line) can be examined in other to determine an optimal and/or satisfactory sample of candidate paths in which to select a path for the data flow of interest. In one embodiment, traffic repository 221 of FIG. 2 is used to provide flow characteristics of each of the previously monitored paths as a benchmark in which a next candidate path's performance can be evaluated. One having ordinary skill in the art will appreciate that once a candidate path is selected, such as the second path at 2260, the candidate path becomes the default path. Thus, the exemplary process shown in FIG. 19 is repeated for any path that has been previously selected as the default path.

Figure 19A:
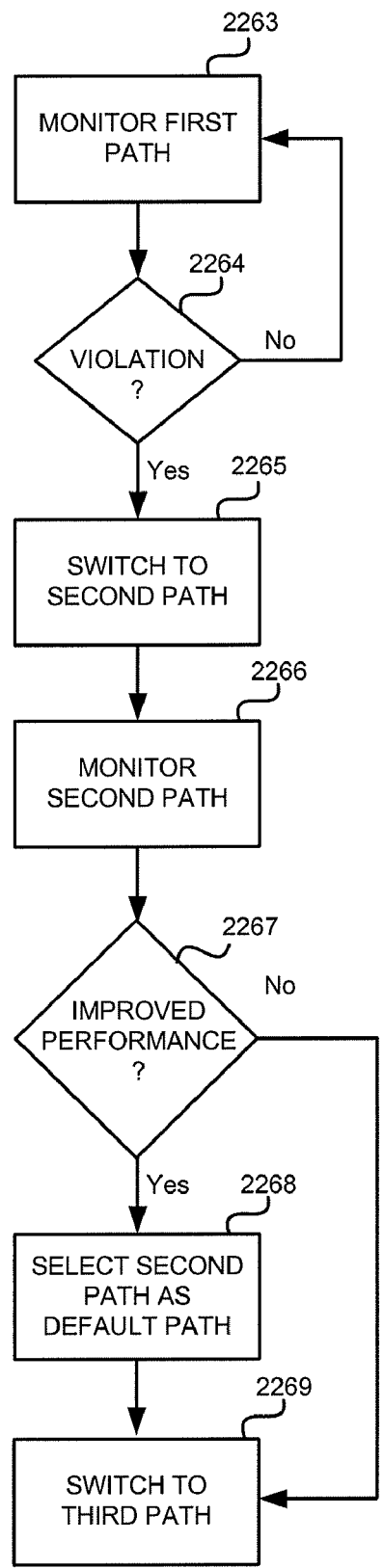
FIG. 19A is a flowchart representing an alternate embodiment.

Referring to FIG. 19A, an exemplary flow control system 2124 can operate to select an improved path by monitoring a sample of candidate paths and selecting a path therefrom. For example, at 2263 a first path is monitored. If there is a policy violation at 2264, system 2124 switches to a second candidate path and monitors the data flow associated with the second candidate path at 2266. In this instance, the flow control system evaluates whether the second candidate's path is improved over the performance of the default path, at 2267.

If the second candidate's path provides improved data flow characteristics over the default path, the second path thus is said to be "available" and is selected as the new default path at 2268. As indicated by 2269 and the dotted lines, more than two candidate paths can be assessed over time to generate a sample of suitable candidate paths over which to route data. When more than two paths are monitored (and their data flow characteristics are assessed), another candidate path (such a third, fourth, fifth, etc. candidate path) is selected if at least one of its data flow characteristic is most optimal relative to the monitored candidate paths of the sample.

In accordance with this embodiment, a number of candidate paths are assessed and the candidate path associated with the most desirable specific data flow characteristic will be selected from the number of assessed candidate paths constituting a sample. For example, consider a situation wherein a second assessed path has at least one specific data flow characteristic that is more desirable than the specific data flow characteristic of a first assessed candidate path. Thereafter, a third candidate path can be assessed, and if its specific characteristic is not more desirable than the second candidate path, either the second path will be selected or the process will continue to assess a fourth candidate path. Alternatively, if the third candidate path is associated with a more desirable data flow characteristic than the previous two candidates, as well as subsequently monitored data flows (e.g., the fourth path), then the third path will be selected.

Figure 20:
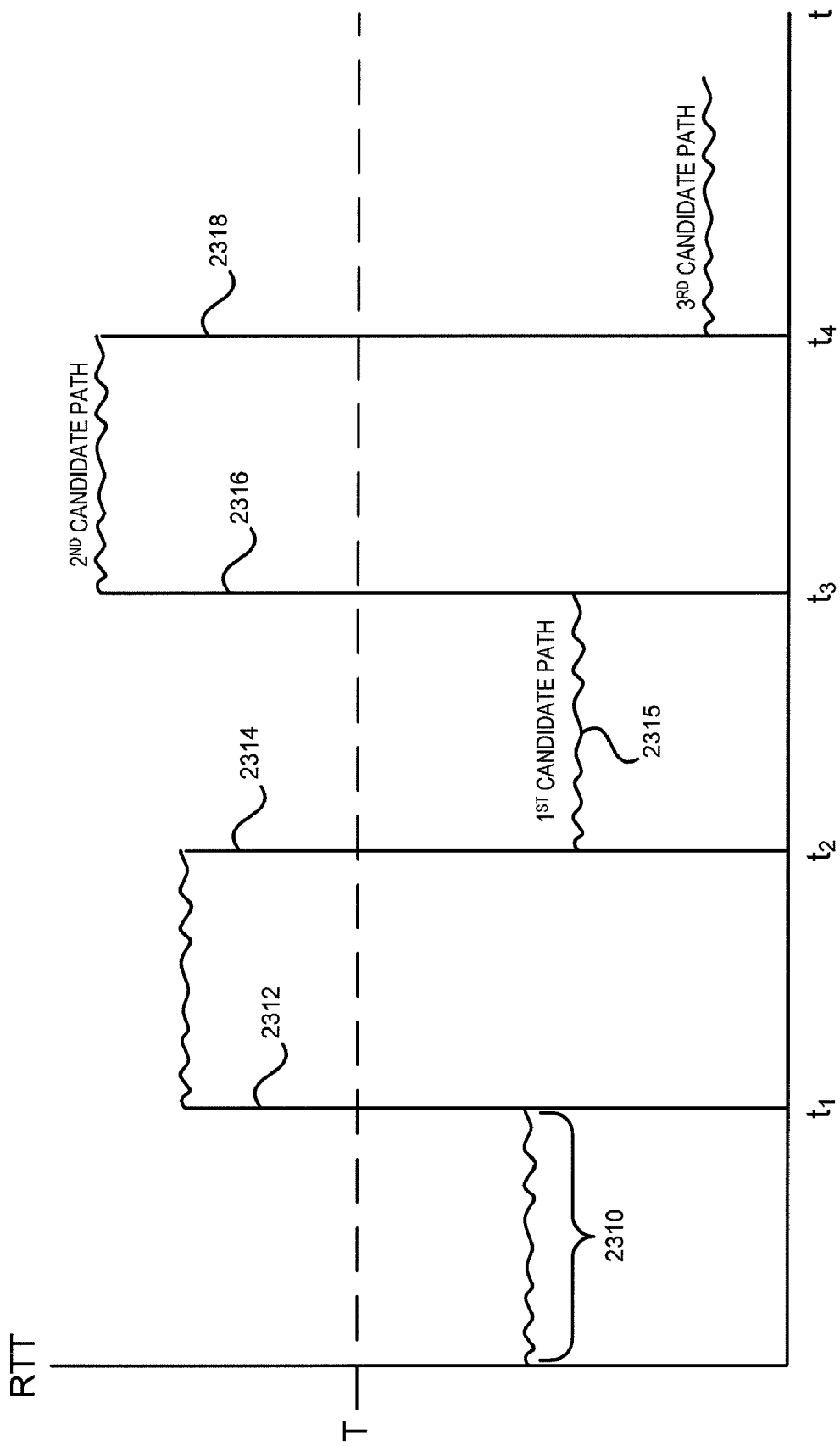
FIG. 20 is a graphical representation illustrating an exemplary method of time division multiplexing of candidate routes in accordance with a specific embodiment of the present invention.

FIG. 20 is a graphical illustration of time division multiplexing of a data flow in accordance with one embodiment. An exemplary passive flow analyzer is monitoring at least one data flow characteristic of a data flow on a default path. In this example, round trip time ("RTT") is being monitored to determine whether the default path is providing optimal performance in relation to other candidate paths and/or at least satisfactory performance in relation to a policy requirement or threshold, demarcated as "T," of FIG. 20. Although RTT is shown in FIG. 20, it should be understood that any data flow characteristic can be used with time-division multiplexing in route control in accordance with the present invention.

Prior to time $t_1$, the monitored specific data flow (i.e., performance) characteristic level RTT is represented as having a value equivalent to level 2310. In this instance, the monitored performance characteristic of interest is below threshold T, and thus in compliance with the policy requirement. At edge 2312, however, the RTT rises to a level that exceeds threshold "T."

At time $t_1$, for example, PFA 2210 observes the non-compliant RTT level associated with the default path. Upon detection of a non-compliant event, controller 2212 instructs router 2118 to assert a route change to a first candidate path having at time $t_2$. The first candidate path has a value equivalent to level 2315. Between times $t_2$ and $t_3$, controller 2212 continues to passively assess network performance of the first candidate path to determine whether it provides the desired network performance.

In one embodiment, controller 2212 sets the first candidate path to the new default path, so long as it meets the policy requirement. If the first candidate path does not meet the policy requirement, the controller asserts one or more additional route changes until the network performance is compliant with the policy, as described in connection with FIG. 19. In another embodiment, the flow control system monitors consecutively a sample of two or more candidate paths in which to select a candidate path. The candidate path can be selected if it has the most desired performance characteristic and/or if it best fits a number of policy requirements, as described above in connection with FIG. 19A.

At time $t_3$ of FIG. 20, controller 2212 asserts another route change to a second candidate path as it forms the sample of candidate paths. Again, controller 2212 uses the output of PFA 2210, and optionally the data stored in the traffic repository, to assess network performance of the second candidate path. At time $t_4$, controller 2212 asserts yet another route change to a third candidate path and monitors the data flow characteristics, such as RTT. After the appropriate sample has been formed, controller 2212 then chooses the candidate path with the most desired or best performance for the new path. In this case, the third candidate path exhibits the best performance as measured by RTT, and hence, is selected.

In yet another embodiment of the present invention, the flow control system simultaneously monitors two or more candidate paths, in parallel, to form a sample of candidate paths in which to select a desired or best performing path to route the data flow. For example, a data flow between a first point and a second point is diverted such that portions (e.g., at least one TCP session or the like) of the data flow are routed over different paths. Each of the different paths is distinguished from each other, for example, by its associated IP address or subset of associated IP addresses (e.g., by prefix) thereof. Route control that samples candidate paths substantially in parallel, as defined by their addresses (or subsets thereof), is referred to as "address-space multiplexing."

Figure 21:
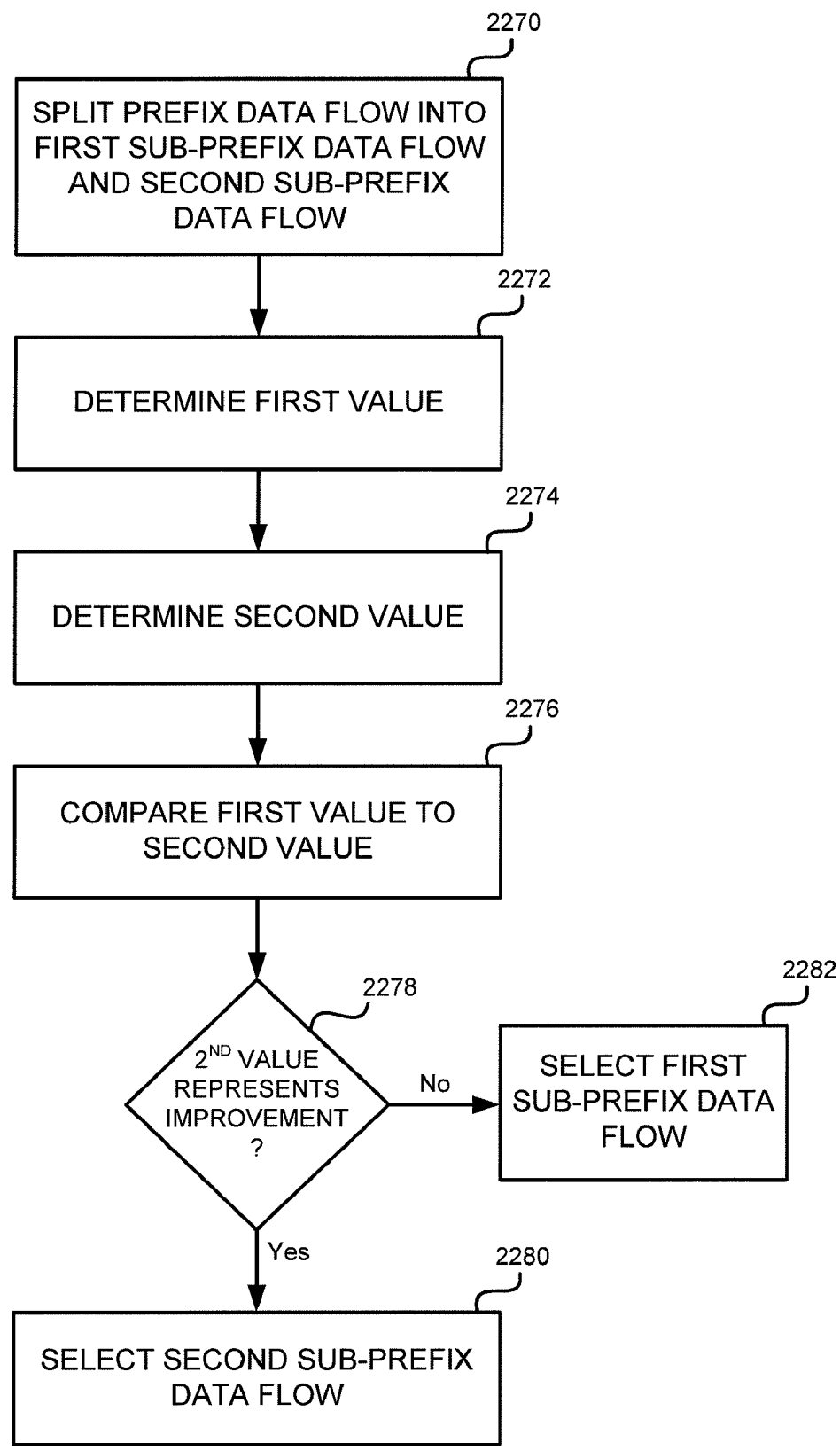
FIG. 21 is a graphical representation illustrating an exemplary method of address space multiplexing of candidate routes in accordance with a specific embodiment of the present invention.

FIG. 21 is a flowchart illustrating an exemplary process of address-space multiplexing in the implementation of route control, in accordance with a specific embodiment. At 2270, controller 2212 instructs configuration element 2217 via router 2118 to split a data flow having an associated group of addresses into at least a first subset of data flows associated with a portion of an original data flow (e.g., a first prefix) and a second subset of data flows associated with another portion of the original data flow (e.g., a second prefix). In accordance with the present invention however, the data flow can be split into more than two subsets of data flows, each associated with a portion of an original data flow.

At 2272, PFA 2210 passively monitors at least one data flow characteristic associated over multiple portions of the data flow that are routed over different paths. For example, a first data flow portion having a first sub-prefix (i.e., a subset of IP addresses) data flow is monitored, and a first value representing its flow characteristic magnitude, for example, can be assigned to the first data flow portion. In this instance, if the passive flow analyzer is specifically monitoring RTT, an actual monitored RTT, such as 30 milliseconds, can be assigned to represent that flow characteristic. In parallel, at 2274, PFA 2210 passively monitors the same data flow characteristic associated with a second data flow portion associated with another sub-prefix (i.e., another subset of IP addresses) to determine a second value of the flow characteristic. The duration of time over which the first and second subsets of associated data flows are monitored and evaluated can be any amount of time necessary to sufficiently describe the flow characteristics of each of the data paths.

At 2276, controller 2212 compares the first value to the second value. At 2278, controller 2212 determines if the second value represents an improvement over the first value. For example, the second value might represent an improvement if the values represented RTT and the second value was smaller (e.g., 25 milliseconds) than the first value (e.g., 30 milliseconds).

If the second value represents an improvement, then, at 2280, controller 2212 selects the path associated with the second subset of addresses of the original data flow. However, if the second value does not represent an improvement, then, at 2282, controller 2212 selects the path related to the first subset of addresses of the original data flow so long as the first subset of addresses of the original data flow is more desired in terms of performance than the default original data flow. It is noteworthy that any number (i.e., a third, a fourth, etc.,) of subset of addresses of the original data flows and their associated paths can be examined. Further, the data flows examined are not limited to being a subset of the addresses of the original data flow.

Figure 22:
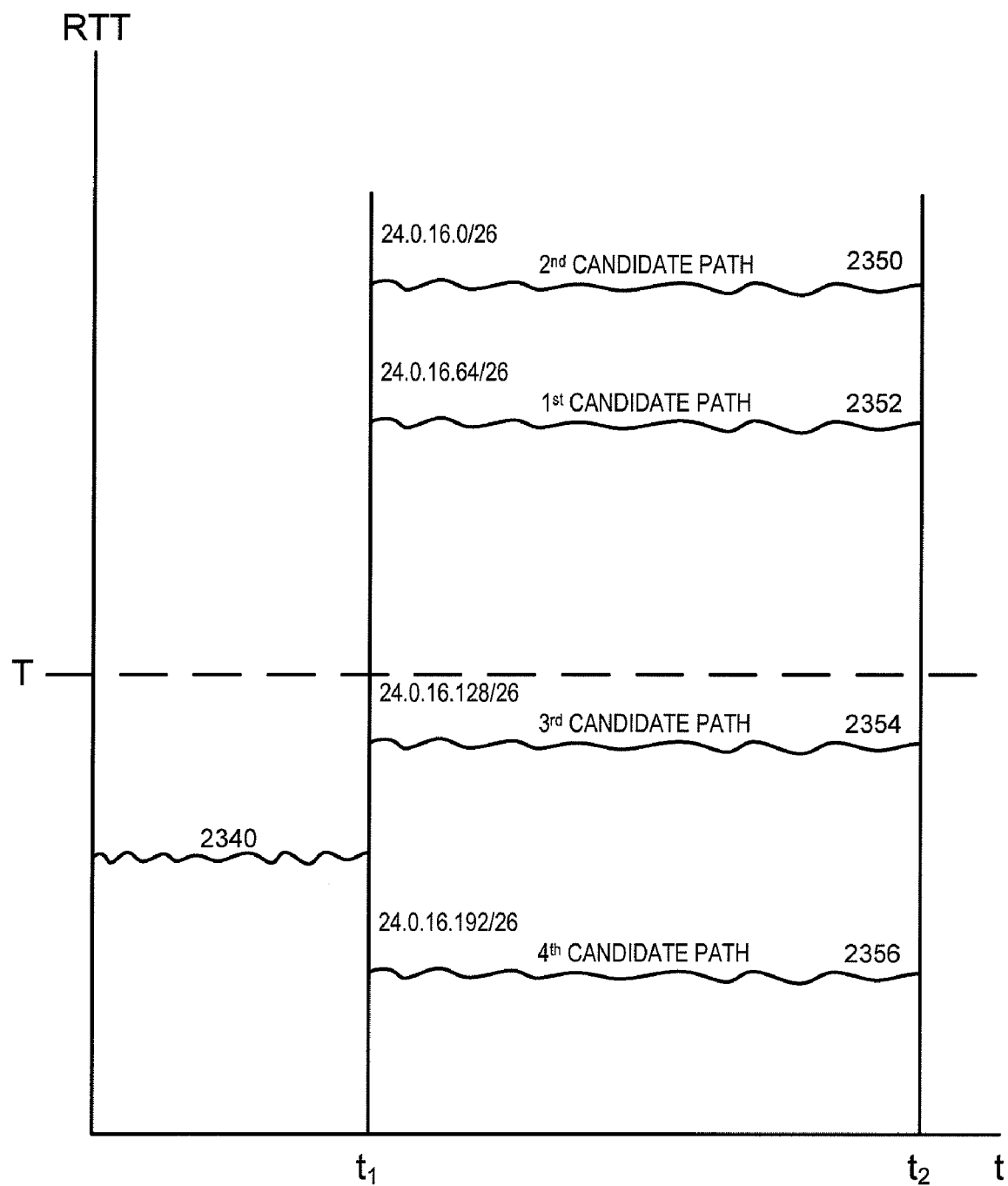
FIG. 22 is a graphical representation of four candidate paths assessed in parallel to passively perform route control in accordance with a specific embodiment of the present invention.

FIG. 22 is a graphical representation of four candidate paths assessed in parallel to passively perform route control. Parallel path assessment results in a much faster measurement and response time. It is again noteworthy that more or fewer candidate paths can be assessed, as mentioned herein. Utilizing a passive monitoring component (i.e., passive calibrator) instead of an active probe component (i.e., active calibrator), such as PFA 2210, a destination prefix 2340 (corresponding to an original path) is split into multiple smaller prefixes (corresponding to candidate paths) 2350, 2352, 2354, 2356, as discussed herein. More specifically, data traffic flowing over a path designated by a single destination set of addresses of the original (e.g., destination prefix) is forced to route using more specific route advertisements over multiple paths designated by smaller or sub-network prefixes. For example, controller 2212 requests a passive assessment of a given destination prefix (e.g., a/24 destination prefix) at time $t_1$ when a problem is noticed. The problem is that the RTT of first candidate path 2310 increased beyond threshold T.

In the example shown in FIG. 22, there are four candidate paths to be assessed to see if the performance of the first candidate path can be improved. There is first candidate path 2352 (e.g., 24.0.16.0/26), second candidate path 2350 (e.g., 24.0.16.64/26), third candidate path 2354 (e.g., 24.0.16.128/26) and fourth candidate path 2356 (e.g., 24.0.16.192/26) are assessed after controller 2212 asserts four corresponding route changes. Each of the candidate paths is represented by a /26 contained in the /24 in one embodiment. For example, 24.0.16.64/26 represents third candidate path 2354.

At time $t_2$, controller 2212 selects the candidate path with the best performance (e.g., shortest RTT). In this example, fourth candidate path 2356 happens to exhibit the best performance characteristics of the candidate paths and is therefore selected therefrom. In one embodiment, if no candidate paths of the four (or other number of) candidate paths meet the threshold requirements, then new candidate paths are selected until one meets the threshold requirements or until a certain amount of time has elapsed.

Although the term "prefix" is used herein to describe the subdivision of IP addresses, it is noteworthy that the embodiments are not limited to the use of a prefix. Rather, any suitable "address set" can be substituted for "prefix," "subprefix," etc. to describe how an address of interest (i.e., destination) can be categorized. The addresses need not be contiguous in a prefix boundary and can be as small as a single active address (i.e., "/24").

Although the present invention has been discussed with respect to specific embodiments, one of ordinary skill in the art will realize that these embodiments are merely illustrative, and not restrictive, of the invention. For example, although the above description describes the network communication data as Internet traffic, it should be understood that the present invention relates to networks in general and need not be restricted to Internet data. The scope of the invention is to be determined solely by the appended claims.

In the foregoing specification, the invention is described with reference to specific embodiments thereof, but those skilled in the art will recognize that while the invention is not limited thereto. Various features and aspects of the above-described invention may be used individually or jointly. Further, although the invention has been described in the context of its implementation in a particular environment and for particular applications, its usefulness is not limited thereto and it can be utilized in any number of environments and applications without departing from the broader spirit and scope thereof. The specification and drawings are, accordingly, to be regarded as illustrative rather than restrictive.

What is claimed is:

1. A method of routing data between a first point and a second point, the method comprising:
    routing a data flow on a first path;
    passively monitoring at least one data flow characteristic associated with the data flow on the first path to determine a first value of the data flow characteristic;
    after a predetermined amount of time, switching the data flow to a second path;
    passively monitoring the at least one data flow characteristic associated with the data flow on the second path to determine a second value of the data flow characteristic after a second predetermined amount of time;
    comparing the first value to the second value;
    selecting either the first path or the second path as a default path for the data flow based on the comparison; and
    routing the data flow on the default path,
    wherein passively monitoring the at least one data flow characteristic associated with the data flow on the first path and passively monitoring the at least one data flow characteristic associated with the data flow on the second path do not introduce additional network traffic.

2. The method of claim 1, further comprising after the second predetermined amount of time, switching the data flow to a third path if the second value does not represent improved performance over the first value.

3. The method of claim 1, wherein selecting either the first path or the second path as a default path comprises selecting the second path if the second value represents improved performance over the first value.

4. The method of claim 1, wherein the at least one data flow characteristic is a performance characteristic.

5. The method of claim 4, wherein the performance characteristic is related to latency.

6. The method of claim 4, wherein the performance characteristic is related to jitter.

7. A method of routing data between a first point and a second point, the method comprising:
    routing a data flow associated with a group of addresses over an initial path;
    splitting the data flow associated with the group of addresses into at least a first data flow associated with a first subset of the group of addresses and a second data flow associated with a second subset of the group of addresses;
    routing the first data flow and the second data flow over different paths, so that the first data flow arrives at a first final destination and the second data flow arrives at a second final destination;
    passively monitoring at least one data flow characteristic associated with the first data flow on a first path and the second data flow on a second path to determine respective values of the data flow characteristic for each of the paths; and
    comparing the values to each other.

8. The method of claim 7, further comprising selecting a path having a value representing improved performance over the respective values of the other paths.

9. The method of claim 7, wherein the passively monitoring occurs simultaneously.

10. The method of claim 7, wherein the at least one data flow characteristic is a performance characteristic.

11. The method of claim 10, wherein the performance characteristic is related to loss.

12. The method of claim 10, wherein the performance characteristic is related to latency.

13. The method of claim 10, wherein the performance characteristic is related to jitter.

14. A method of routing data between a first point and a second point, the method comprising:
    splitting a data flow associated with a group of addresses into a first data flow associated with a first subset of addresses and a second data flow associated with a second subset of addresses, so that the first data flow arrives at a first final destination and the second data flow arrives at a second final destination;
    passively monitoring at least one data flow characteristic associated with the first data flow to determine a first value of a data flow characteristic;
    passively monitoring at least one data flow characteristic associated with the second data flow to determine a second value of the data flow characteristic;
    comparing the first value to the second value; and
    selecting a path associated with the second subset of addresses for the data flow if the second value represents improved performance over the first value.

15. An apparatus for routing data between a first point and a second point, the apparatus comprising:
    means for routing a data flow on a first path for a predetermined amount of time;
    means for passively monitoring at least one data flow characteristic associated with the data flow on the first path to determine a first value of the data flow characteristic;
    means for switching the data flow to a second data path after the predetermined amount of time has expired;
    means for passively monitoring at least one data flow characteristic associated with the data flow on the second path to determine a second value of the data flow characteristic after a second predetermined amount of time;

means for comparing the first value to the second value and for selecting either the first path or the second path as a default path for the data flow based on the comparison, wherein the means for passively monitoring at least one data flow characteristic associated with the data flow on the first path and the means for passively monitoring at least one data flow characteristic associated with the data flow on the second path do not introduce additional network traffic.

16. An apparatus for routing data between a first point and a second point, the apparatus comprising:

means for splitting a data flow associated with a group of addresses into at least a first data flow associated with a first subset of addresses within the group of addresses and a second data flow associated with a second subset of addresses within the group of addresses;

means for routing the first data flow and the second data flow over different paths, so that the first data flow arrives at a first final destination and the second data flow arrives at a second final destination;

means for passively monitoring at least one data flow characteristic associated with the first data flow on a first path and the second data flow on a second path to determine respective values of the data flow characteristic for each of the paths; and means for comparing the respective values.

17. A computer-readable media having computer-executable instructions stored thereon for routing data between a first point and a second point, comprising:

instructions for routing a data flow on a first data path for a predetermined amount of time;

instructions for passively monitoring at least one data flow characteristic associated with the data flow on the first path to determine a first value of the data flow characteristic;

instructions for switching the data flow to a second data path after the predetermined amount of time has expired;

instructions for passively monitoring at least one data flow characteristic associated with the data flow on the second path to determine a second value of the data flow characteristic after a second predetermined amount of time;

instructions for comparing the first value to the second value; and instructions for selecting either the first path or the second path as a default path for the data flow based on the comparison, wherein the instructions for passively monitoring at least one data flow characteristic associated with the data flow on the first path and the instructions for passively monitoring at least one data flow characteristic associated with the data flow on the second path do not introduce additional network traffic.

18. A computer-readable media having computer-executable instructions stored thereon for routing data between a first point and a second point, comprising:

instructions for splitting a data flow associated with a group of addresses into at least a first data flow associated with a first subset of addresses within the group of addresses and a second data flow associated with a second subset of addresses within the group of addresses;

instructions for routing the first data flow and the second data flow over different paths, so that the first data flow arrives at a first final destination and the second data flow arrives at a second final destination;

instructions for passively monitoring at least one data flow characteristic associated with the first data flow on a first path and the second data flow on a second path to determine respective values of the data flow characteristic for each of the paths; and instructions for comparing the values to each other.

19. The method of claim 7 wherein the first subset of addresses is associated with a first address prefix that is longer than an address prefix of the group of addresses and the second subset of addresses is associated with a second address prefix that is longer than the address prefix of the group of addresses.

20. The apparatus of claim 16, wherein the apparatus is an edge network device.

21. The computer-readable media of claim 18 wherein the first subset of addresses is associated with a first address prefix that is longer than an address prefix of the group of addresses and the second subset of addresses is associated with a second address prefix that is longer than the address prefix of the group of addresses.

* * * * *